(12) United States Patent
Fan et al.

(10) Patent No.: US 9,371,227 B2
(45) Date of Patent: Jun. 21, 2016

(54) INTEGRATION OF REFORMING/WATER SPLITTING AND ELECTROCHEMICAL SYSTEMS FOR POWER GENERATION WITH INTEGRATED CARBON CAPTURE

(75) Inventors: Liang-Shih Fan, Columbus, OH (US); Fanxing Li, Columbus, OH (US); Liang Zeng, Columbus, OH (US); Deepak Sridhar, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 260 days.

(21) Appl. No.: 13/394,572

(22) PCT Filed: Sep. 8, 2010

(86) PCT No.: PCT/US2010/048125
§ 371 (c)(1),
(2), (4) Date: Mar. 7, 2012

(87) PCT Pub. No.: WO2011/031755
PCT Pub. Date: Mar. 17, 2011

(65) Prior Publication Data
US 2012/0171588 A1 Jul. 5, 2012

Related U.S. Application Data

(60) Provisional application No. 61/240,508, filed on Sep. 8, 2009.

(51) Int. Cl.
*H01M 8/06* (2006.01)
*H01M 8/18* (2006.01)
(Continued)

(52) U.S. Cl.
CPC ............... *C01B 3/344* (2013.01); *C01B 3/063* (2013.01); *C01B 3/34* (2013.01); *C10J 3/46* (2013.01);
(Continued)

(58) Field of Classification Search
CPC .......... C01B 3/344; C01B 3/063; C01B 3/34; C01B 2203/0216; C01B 2203/0222; C01B 2203/0233; C01B 2203/0238; C01B 2203/066; C01B 2203/0827; C01B 2203/148; C10J 3/725; C10J 3/46; C10J 2300/0916; C10J 2300/093; C10J 2300/0959; C10J 2300/0993; C10J 2300/1612; C10J 2300/1646; C10J 2300/1678; C10J 2300/1807; H01M 8/0618; H01M 2008/1293; H01M 2008/147; Y02E 60/36; Y02E 60/50; Y02E 20/185; Y02E 60/525; Y02E 60/526; C10K 1/003; C10K 1/024; C10K 3/026

See application file for complete search history.

(56) References Cited

U.S. PATENT DOCUMENTS 971,206 A 9/1910 Messerschmitt
1,078,686 A 11/1913 Lane
(Continued)

FOREIGN PATENT DOCUMENTS

CN 101389734 A 3/2009
CN 101426885 A 5/2009
(Continued)

OTHER PUBLICATIONS

Blomen, L.J.M.J and Mugerwa, M.N., Ed. "Fuel Cell Systems", Plenum Press, New York, 1993, p. 63.*
(Continued)

*Primary Examiner* — Carlos Barcena
*Assistant Examiner* — Lilia V Nedialkova
(74) *Attorney, Agent, or Firm* — Michael Best & Friedrich LLP

(57) ABSTRACT

High efficiency electricity generation processes and systems with substantially zero $CO_2$ emissions are provided. A closed looping between the unit that generates gaseous fuel ($H_2$, CO, etc) and the fuel cell anode side is formed. In certain embodiments, the heat and exhaust oxygen containing gas from the fuel cell cathode side are also utilized for the gaseous fuel generation. The resulting power generation efficiencies are improved due to the minimized steam consumption for the gaseous fuel production in the fuel cell anode loop as well as the strategic mass and energy integration schemes.

18 Claims, 10 Drawing Sheets

(51) Int. Cl.
*C01B 3/34* (2006.01)
*C01B 3/06* (2006.01)
*C10J 3/72* (2006.01)
*C10J 3/46* (2006.01)
*C10K 3/02* (2006.01)
*H01M 8/12* (2016.01)
*H01M 8/14* (2006.01)
*C10K 1/00* (2006.01)
*C10K 1/02* (2006.01)

(52) U.S. Cl.
CPC .................. *C10J 3/725* (2013.01); *C10K 3/026* (2013.01); *H01M 8/0618* (2013.01); *C01B 2203/0216* (2013.01); *C01B 2203/0222* (2013.01); *C01B 2203/0233* (2013.01); *C01B 2203/0238* (2013.01); *C01B 2203/066* (2013.01); *C01B 2203/0827* (2013.01); *C01B 2203/148* (2013.01); *C10J 2300/093* (2013.01); *C10J 2300/0916* (2013.01); *C10J 2300/0959* (2013.01); *C10J 2300/0993* (2013.01); *C10J 2300/1612* (2013.01); *C10J 2300/1646* (2013.01); *C10J 2300/1678* (2013.01); *C10J 2300/1807* (2013.01); *C10K 1/003* (2013.01); *C10K 1/024* (2013.01); *H01M 2008/1293* (2013.01); *H01M 2008/147* (2013.01); *Y02E 20/18* (2013.01); *Y02E 20/185* (2013.01); *Y02E 60/36* (2013.01); *Y02E 60/50* (2013.01); *Y02E 60/525* (2013.01); *Y02E 60/526* (2013.01); *Y02P 20/146* (2015.11); *Y02P 70/56* (2015.11)

(56) References Cited

U.S. PATENT DOCUMENTS

| | | |
|---|---|---|
| 1,658,939 A | 2/1928 | Parsons |
| 2,182,747 A | 12/1939 | Marshall, Jr. |
| 2,198,560 A | 4/1940 | Marshall, Jr. |
| 2,449,635 A | 9/1948 | Barr |
| 2,614,067 A | 10/1952 | Reed et al. |
| 2,635,947 A | 4/1953 | Reed et al. |
| 2,686,819 A | 8/1954 | Johnson |
| 2,694,622 A | 11/1954 | Reed et al. |
| 2,697,686 A | 12/1954 | Leffer |
| 2,899,374 A | 8/1959 | Gomory |
| 3,027,238 A | 3/1962 | Watkins |
| 3,031,287 A | 4/1962 | Benson et al. |
| 3,338,667 A | 8/1967 | Pundsack |
| 3,353,925 A | 11/1967 | Baumann et al. |
| 3,421,869 A | 1/1969 | Benson |
| 3,442,613 A | 5/1969 | Grotz, Jr. |
| 3,442,619 A | 5/1969 | Huebler et al. |
| 3,442,620 A | 5/1969 | Huebler et al. |
| 3,494,858 A | 2/1970 | Luckenbach |
| 3,573,224 A | 3/1971 | Strelzoff et al. |
| 3,619,142 A | 11/1971 | Johnson et al. |
| 3,726,966 A | 4/1973 | Johnston |
| 4,017,270 A | 4/1977 | Funk et al. |
| 4,057,402 A | 11/1977 | Patel et al. |
| 4,108,732 A | 8/1978 | Nuttall, Jr. |
| 4,272,399 A | 6/1981 | Davis et al. |
| 4,325,833 A | 4/1982 | Scott |
| 4,334,959 A | 6/1982 | Green |
| 4,343,624 A | 8/1982 | Belke et al. |
| 4,348,487 A | 9/1982 | Goldstein et al. |
| 4,404,086 A | 9/1983 | Oltrogge |
| 4,420,332 A | 12/1983 | Mori et al. |
| 4,521,117 A | 6/1985 | Ouwerkerk et al. |
| 4,778,585 A | 10/1988 | Graff |
| 4,842,777 A | 6/1989 | Lamort |
| 4,861,165 A | 8/1989 | Fredriksson et al. |
| 4,869,207 A | 9/1989 | Engstrom et al. |
| 4,895,821 A | 1/1990 | Kainer et al. |
| 4,902,586 A * | 2/1990 | Wertheim ............... 429/423 |
| 5,130,106 A | 7/1992 | Koves et al. |
| 5,365,560 A | 11/1994 | Tam |
| 5,447,024 A | 9/1995 | Ishida et al. |
| 5,509,362 A | 4/1996 | Lyon |
| 5,518,187 A | 5/1996 | Bruno et al. |
| 5,529,599 A | 6/1996 | Calderon |
| 5,730,763 A | 3/1998 | Manulescu et al. |
| 5,770,310 A | 6/1998 | Noguchi et al. |
| 5,827,496 A | 10/1998 | Lyon |
| 6,007,699 A | 12/1999 | Cole |
| 6,143,253 A | 11/2000 | Radcliffe et al. |
| 6,180,354 B1 | 1/2001 | Singh et al. |
| 6,361,757 B1 | 3/2002 | Shikada et al. |
| 6,412,559 B1 | 7/2002 | Gunter et al. |
| 6,494,153 B1 | 12/2002 | Lyon |
| 6,509,000 B1 | 1/2003 | Choudhary et al. |
| 6,517,631 B1 | 2/2003 | Bland |
| 6,631,698 B1 | 10/2003 | Hyppanen et al. |
| 6,642,174 B2 | 11/2003 | Gaffney et al. |
| 6,663,681 B2 | 12/2003 | Kindig et al. |
| 6,667,022 B2 | 12/2003 | Cole |
| 6,669,917 B2 | 12/2003 | Lyon |
| 6,682,714 B2 | 1/2004 | Kindig et al. |
| 6,685,754 B2 | 2/2004 | Kindig et al. |
| 6,703,343 B2 | 3/2004 | Park |
| 6,797,253 B2 | 9/2004 | Lyon |
| 6,834,623 B2 | 12/2004 | Cheng |
| 6,875,411 B2 | 4/2005 | Sanfilippo et al. |
| 6,880,635 B2 | 4/2005 | Vinegar et al. |
| 7,001,579 B2 | 2/2006 | Metzger et al. |
| 7,244,399 B2 | 7/2007 | Myohanen et al. |
| 7,404,942 B2 | 7/2008 | Sanfilippo et al. |
| 7,496,450 B2 | 2/2009 | Ortiz Alemen et al. |
| 7,767,191 B2 | 8/2010 | Thomas et al. |
| 7,837,975 B2 | 11/2010 | Iyer et al. |
| 7,840,053 B2 | 11/2010 | Liao |
| 8,116,430 B1 | 2/2012 | Shapiro et al. |
| 8,192,706 B2 | 6/2012 | Grochowski |
| 8,202,349 B2 | 6/2012 | Molaison |
| 8,419,813 B2 | 4/2013 | Hoteit et al. |
| 8,435,920 B2 | 5/2013 | White et al. |
| 8,508,238 B2 | 8/2013 | Mahalingam et al. |
| 8,761,943 B2 | 6/2014 | Lou et al. |
| 8,771,549 B2 | 7/2014 | Gauthier et al. |
| 8,814,963 B2 | 8/2014 | Apanel et al. |
| 8,877,147 B2 | 11/2014 | Fan et al. |
| 2001/0055559 A1 | 12/2001 | Sanfilippo et al. |
| 2003/0024388 A1 | 2/2003 | Scharpf |
| 2003/0031291 A1 | 2/2003 | Yamamoto et al. |
| 2003/0119658 A1 | 6/2003 | Allison et al. |
| 2003/0130360 A1 | 7/2003 | Kindig et al. |
| 2003/0180215 A1 | 9/2003 | Niu et al. |
| 2003/0188668 A1 | 10/2003 | Bland |
| 2004/0028181 A1 | 2/2004 | Charles Jr. et al. |
| 2004/0030214 A1 | 2/2004 | Schindler et al. |
| 2004/0109800 A1 | 6/2004 | Pahlman et al. |
| 2004/0126293 A1 | 7/2004 | Geerlings et al. |
| 2004/0131531 A1 | 7/2004 | Geerlings et al. |
| 2004/0132833 A1 | 7/2004 | Espinoza et al. |
| 2004/0138060 A1 | 7/2004 | Rapier et al. |
| 2004/0197612 A1* | 10/2004 | Keefer et al. ............ 429/13 |
| 2004/0213705 A1 | 10/2004 | Blencoe et al. |
| 2004/0233191 A1 | 11/2004 | Mukherjee et al. |
| 2004/0244289 A1 | 12/2004 | Morozumi et al. |
| 2004/0265224 A1 | 12/2004 | Papavassiliou et al. |
| 2005/0002847 A1 | 1/2005 | Maroto-Valer et al. |
| 2005/0054880 A1 | 3/2005 | Dubois et al. |
| 2005/0175533 A1 | 8/2005 | Thomas et al. |
| 2005/0255037 A1 | 11/2005 | Otsuka et al. |
| 2005/0265912 A1 | 12/2005 | Alvarez Jr et al. |
| 2005/0274648 A1 | 12/2005 | Goldstein et al. |
| 2006/0042565 A1 | 3/2006 | Hu |
| 2006/0094593 A1 | 5/2006 | Beech, Jr. et al. |
| 2007/0010588 A1 | 1/2007 | Pearson |
| 2007/0049489 A1 | 3/2007 | Becue et al. |
| 2007/0157517 A1 | 7/2007 | Tsay et al. |
| 2007/0258878 A1 | 11/2007 | Sanfilippo et al. |
| 2008/0031809 A1 | 2/2008 | Norbeck et al. |
| 2008/0161624 A1 | 7/2008 | Glover et al. |

(56) References Cited

U.S. PATENT DOCUMENTS

| | | |
|---|---|---|
| 2008/0209807 A1 | 9/2008 | Tsangaris et al. |
| 2009/0000194 A1 | 1/2009 | Fan et al. |
| 2009/0042070 A1* | 2/2009 | Brown et al. .................. 429/17 |
| 2009/0160461 A1 | 6/2009 | Zangl et al. |
| 2010/0071262 A1 | 3/2010 | Robinson et al. |
| 2010/0184589 A1 | 7/2010 | Miyairi et al. |
| 2010/0187159 A1 | 7/2010 | Naunheimer |
| 2010/0258429 A1 | 10/2010 | Ugolin |
| 2010/0293845 A1 | 11/2010 | Zeman et al. |
| 2010/0332170 A1 | 12/2010 | Gao et al. |
| 2011/0005395 A1 | 1/2011 | Vimalchand et al. |
| 2011/0011720 A1 | 1/2011 | Rinker |
| 2011/0054049 A1 | 3/2011 | Lambert et al. |
| 2011/0094226 A1 | 4/2011 | McHugh et al. |
| 2011/0146152 A1 | 6/2011 | Vimalchand et al. |
| 2011/0176968 A1 | 7/2011 | Fan et al. |
| 2011/0289845 A1 | 12/2011 | Davis et al. |
| 2011/0291051 A1 | 12/2011 | Hershkowitz et al. |
| 2011/0300060 A1 | 12/2011 | Guillou et al. |
| 2011/0303875 A1 | 12/2011 | Hoteit et al. |
| 2012/0159841 A1 | 6/2012 | Fan et al. |
| 2012/0167585 A1 | 7/2012 | Wormser |
| 2012/0214106 A1 | 8/2012 | Sit et al. |
| 2013/0085365 A1 | 4/2013 | Marashdeh et al. |
| 2013/0149650 A1 | 6/2013 | Gauthier et al. |
| 2013/0255272 A1 | 10/2013 | Ajhar et al. |
| 2014/0034134 A1 | 2/2014 | Fan et al. |
| 2014/0072917 A1 | 3/2014 | Fan et al. |
| 2014/0144082 A1 | 5/2014 | Fan et al. |
| 2014/0295361 A1 | 10/2014 | Fan et al. |
| 2015/0238915 A1 | 8/2015 | Fan et al. |

FOREIGN PATENT DOCUMENTS

| | | |
|---|---|---|
| CN | 102612625 | 7/2012 |
| EP | 1134187 A2 | 9/2001 |
| EP | 1445018 A1 | 8/2004 |
| EP | 1580162 A2 | 9/2005 |
| EP | 1845579 A2 | 10/2007 |
| EP | 1933087 | 6/2008 |
| EP | 2450420 | 5/2012 |
| EP | 2515038 | 10/2012 |
| EP | 2601443 | 6/2013 |
| FR | 2924035 | 5/2009 |
| JP | H10249153 A | 9/1998 |
| TW | 406055 B | 9/2000 |
| TW | 426728 B | 3/2001 |
| WO | 90/13773 | 11/1990 |
| WO | 9965097 A1 | 12/1999 |
| WO | 0022690 A1 | 4/2000 |
| WO | WO 00/22690 A1 | 4/2000 |
| WO | 00/68339 | 11/2000 |
| WO | 0142132 A1 | 6/2001 |
| WO | 03/070629 | 8/2003 |
| WO | 2007/082089 A2 | 7/2007 |
| WO | 2007/134075 | 11/2007 |
| WO | 2007122498 A2 | 11/2007 |
| WO | 2008019079 A2 | 2/2008 |
| WO | 2008082312 A1 | 7/2008 |
| WO | 2008/115076 | 9/2008 |
| WO | 2009/007200 | 1/2009 |
| WO | 2009/009388 | 1/2009 |
| WO | 2009021258 A1 | 2/2009 |
| WO | 2009/114309 | 9/2009 |
| WO | 2010/037011 A2 | 4/2010 |
| WO | 2010063923 A2 | 6/2010 |
| WO | 2010/126617 | 11/2010 |
| WO | 2011/021161 | 2/2011 |
| WO | 2011/031752 | 3/2011 |
| WO | 2011/031755 | 3/2011 |
| WO | 2012/064712 | 5/2012 |
| WO | 2012/077978 | 6/2012 |
| WO | 2012/155054 | 11/2012 |
| WO | 2012/155059 | 11/2012 |
| WO | 2013/040645 | 3/2013 |
| WO | 2014/085243 | 6/2014 |

OTHER PUBLICATIONS

Steinfeld et al., Design Aspects of Solar Thermochemical Engineering—A Case Study: Two-Step Water-Splitting Cycle Using the Fe3O4/FeO Redox System, Solar Energy, vol. 65, No. 1, pp. 43-53, Jan. 1999.

Huijgen et al., "Carbon dioxide sequestration by mineral carbonation", ECN-C--03-016, www.ecn.nl/docs/library/report/200e/c03016.pdf, Feb. 2003.

Jadhav et al., "Carbonation of Mg-Bearing Minerals: Kinetic and Mechanistic Studies", Ohio Coal Research Consortium/Ohio State University Project C3.12, www.ohiocoal.org/projects/year3/c3.12, Jul. 3, 2002.

Li et at., "Clean coal conversion processes—progress and challenges", The Royal Society of Chemistry, Energy & Environmental Science, vol. 1, pp. 248-267, Jul. 30, 2008.

Mattisson et al., "Applications of chemical-looping combustion with capture of CO2", Second Nordic Minisymposium on Carbon Dioxide Capture and Storate, Goeteborg, pp. 46-51, Oct. 26, 2001.

Mattison et al., "Reactivity of Some Metal Oxides Supported on Alumina with Alternating Methane and Oxygen—Application for Chemical-Looping Combustion", energy & Fuels, vol. 17, pp. 643-651, 2003.

Mattison et al., "The use of iron oxide as an oxygen carrier in chemical-looping combustion of methane with inherent separation of CO2", Fuel, vol. 80, pp. 1953-1962, 2001.

Mattisson et al., "Use of Ores and Industrial Products As Oxygen Carriers in Chemical-Looping Combustion", Energy & Fuels, vol. 23, pp. 2307-2315, 2009.

O'Connor et al., "Carbon Dioxide Sequestration by Direct Mineral Carbonation: Results from Recent Studies and Current Status", Abstract, USDOE Office of Fossil Energy, 2001.

Park et al., "CO2 Mineral Sequestration: Chemically Enhanced Aqueous Carbonation of Serpentine", The Canadian Journal of Chemical Engineering, vol. 81, pp. 885-890, Jun.-Aug. 2003.

Park et al., "CO2 Mineral Sequestration: physically activated dissolution of serpentine and pH swing process", Chemical Engineering Science, vol. 59, pp. 5241-5247, 2004.

Russo et al., "Impact of Process Design of on the Multiplicity Behavior of a Jacketed Exothermic CSTR", AIChE Journal, vol. 41, No. 1, pp. 135-147, Jan. 1995.

Shen et al, "Chemical-Looping Combustion of Biomass in a 10 kWth Reactor with Iron Oxide as an Oxygen Carrier", Energy & Fuels, vol. 23, pp. 2498-2505, 2009.

Steinfeld et al., "Design Aspects of Solar Thermochemical Engineering—A Case Study: Two-Step Water-Splitting Cycle Using the Fe3O4/FeO Redox System" Solar Energy, vol. 65, No. 1, pp. 43-53, 1999.

Steinfeld, "Solar hydrogen production via a two-step water-splitting thermochemical cycle based on Zn/ZnO redox reactions", International Journal of Hydrogen Energy, vol. 27, pp. 611-619, 2002.

Vernon et al., "Partial Oxidation of Methane to Synthesis Gas", Catalysis Letters, vol. 6, pp. 181-186, 1990.

International Search Report and Written Opinion for International Application PCT/US2010/048125 dated Dec. 17, 2010.

International Preliminary Report on Patentability for International Application PCT/US2010/048125 dated Mar. 22, 2012.

Office Action for Chinese Patent Application No. 201080048130.2 dated Nov. 13, 2013.

Fan et al., "Utilization of chemical looping strategy in coal gasification processes", Particuology, vol. 6, pp. 131-142, 2008.

Hildebrandt et al., "Producing Transportation Fuels with Less Work", Science, vol. 323, pp. 1680-1681, Mar. 27, 2009.

Kaiser et al., "Precombusion and Postcombustion Decarbonization", IEEE, Power Engineering Review, pp. 15-17, Apr. 2001.

Li et al., "Clean coal conversion process—progress and challenges", Energy & Environmental Science, vol. 1, pp. 248-267, Jul. 11, 2008.

(56) References Cited

OTHER PUBLICATIONS

Ockwig et al., "Membranes Hydrogen Separation", American Chemical Society, Chem. Rev., vol. 107, pp. 4078-4110, Oct. 10, 2007.
European Search Report for Application No. 07716591.8 dated Mar. 6, 2012.
International Search Report and Written Opinion for International Application No. PCT/US2007/000956 dated Dec. 4, 2007.
International Preliminary Report on Patentability for International Application No. PCT/US2007/000956 dated Jul. 24, 2008.
International Search Report and Written Opinion for International Application No. PCT/US2009/058579 dated Aug. 3, 2010.
International Search Report and Written Opinion for International Application No. PCT/US2010/048121 dated Apr. 1, 2011.
International Preliminary Report on Patentability for International Application No. PCT/US2010/048121 dated Mar. 22, 2012.
International Search Report and Written Opinion for International Application No. PCT/US2011/059736 dated Mar. 27, 2012.
International Preliminary Report on Patentability for International Application No. PCT/US2011/059736 dated May 23, 2013.
International Search Report and Written Opinion for International Application No. PCT/US2012/37544 dated Aug. 10, 2012.
International Preliminary Report on Patentability for International Application No. PCT/US2012/037544 dated Nov. 12, 2013.
International Search Report and Written Opinion for International Application No. PCT/US2012/037557 dated Aug. 13, 2012.
International Preliminary Report on Patentability for International Application No. PCT/US2012/037557 dated Nov. 21, 2013.
Office Action pertaining to U.S. Appl. No. 12/160,803 dated Jun. 7, 2011.
Final Rejection pertaining to U.S. Appl. No. 12/160,803 dated Jan. 5, 2012.
Office Action pertaining to U.S. Appl. No. 12/160,803 dated Jun. 5, 2012.
Final Rejection pertaining to U.S. Appl. No. 12/160,803 dated Mar. 22, 2013.
Advisory Action pertaining to U.S. Appl. No. 12/160,803 dated Jul. 11, 2013.
Examiner's Answer before the Patent Trial and Appeal Board for U.S. Appl. No. 12/160,803 dated Nov. 4, 2013.
Office Action for Canadian Application No. 2636325 dated Dec. 5, 2012.
Office Action for Chinese Patent Application No. 200780006757.X dated Apr. 11, 2011.
Office Action for Chinese Patent Application No. 200780006757.X dated Dec. 8, 2011.
Office Action for Chinese Patent Application No. 200780006757.X dated Jul. 4, 2012.
Final Rejection for Chinese Patent Application No. 200780006757.X dated Feb. 1, 2013.
Office Action for Chinese Patent Application No. 201110226206.2 dated Sep. 5, 2012.
Office Action for Chinese Patent Application No. 201110226206.2 dated May 14, 2013.
Office Action for Chinese Patent Application No. 201110226206.2 dated Sep. 18, 2013.
Office Action pertaining to U.S. Appl. No. 13/121,009 dated Sep. 6, 2012.
Final Rejection pertaining to U.S. Appl. No. 13/121,009 dated Mar. 14, 2013.
Advisory Action pertaining to U.S. Appl. No. 13/121,009 dated Jun. 24, 2013.
Office Action pertaining to U.S. Appl. No. 13/121,009 dated Sep. 13, 2013.
Final Rejection pertaining to U.S. Appl. No. 13/121,009 dated Jan. 16, 2014.
Office Action for Taiwanese Patent Application No. 098132745 dated Aug. 7, 2013.
Office Action for Taiwanese Patent Application No. 098132745 dated Oct. 17, 2012.
Office Action for Chinese Patent Application No. 200980141285.8 dated Feb. 26, 2013.
Office Action for Chinese Patent Application No. 200980141285.8 dated Oct. 29, 2013.
Office Action for Chinese Patent Application No. 201080048173.0 dated Nov. 18, 2013.
Annual Project Report as of Dec. 2001.
Cho et al., "Comparison of iron-, nickel, copper- and manganese-based oxygen carriers for chemical-looping combustion", Fuel, vol. 83, pp. 1215-1225, 2004.
U.S. Department of Energy, NCCTI Energy Technologies Group, Office of Fossil Energy, "CO2 Capture and Storage in Geologic Formations", pp. 34, Revised Jan. 8, 2002.
Environmental Protection Agency, "Geological CO2 Sequestration Technology and Cost Analysis", Technical Support Document, pp. i-vi & pp. 1-61, Jun. 2008.
Geldart, "Types of Gas Fluidization", Powder Technology, vol. 7, pp. 285-292, 1973.
Haque, "Microwave energy for mineral treatment processes—a brief review", International Journal of Mineral Processing, vol. 57, pp. 1-24, 1999.
Hawley's Condensed Chemical Dictionary, entry for "ammonium bisulfate", John Wiley & Sons, Inc. 2002.
Hossain et al., "Chemical-looping combusion (CLC) for inherent CO2 separations—a review", Chemical Engineering Science, vol. 63, pp. 4433-4451; 2008.
Jin et al., "Development of a Novel Chemical-Looping Combustion: Synthesis of a Looping Material with a Double Metal Oxide of CoO—NiO", Energy & Fuels, vol. 12, pp. 1272-1277, 1998.
Herzog, "Carbon Sequestration via Mineral Carbonation: Overview and Assessment", MIT Laboratory for Energy and the Environment, http://sequestration.mit.edu/pdf/carbonates.pdf, Mar. 14, 2002.
Ohio Coal Development Office of the Ohio Air Quality Development Authority, "Ohio Coal Research Consortium (OCRC)—IV, Year 3 Proposals Solicitation", http://www.ohioairquality.org/ocdo/other_pdf/Consortium_IV_Year_3_RFP. pdf.
Abad et al., "Chemical-looping combustion in a 300 W continuously operating reactor system using a manganese-based oxygen carrier," Fuel, 2006, vol. 85, Issue 9, pp. 1174-1185.
Abad et al., "Reduction Kinetics of CU-, Ni-, and Fe- Based Oxygen Carriers Using Syngas (CO+H2) for Chemical-Looping Combustion," Energy Fuels, 2007, 21 (4), pp. 1843-1853.
Abad et al., "The use of iron oxide as oxygen carrier in a chemical-looping reactor," Fuel, 2007, vol. 86, Issues 7-8, pp. 1021-1035.
Adanez et al., "Progress in Chemical-Looping Combustion and Reforming technologies," Progress in Energy and Combustion Science, 2012, vol. 38, Issue 2, pp. 215-282.
Azis et al., "On the evaluation of synthetic and natural ilmenite using syngas as fuel in chemical-looping combustion (CLC)," Chemical Engineering Research and Design, 2010, vol. 88, Issue 11, pp. 1505-1514.
Balasubramanian et al., "Hydrogen from methane in a single-step process," Chem Engr Science, 1999, 54(15-16), 3543.
Cao et al., "Investigation of Chemical Looping Combustion by Solid Fuels. 1. Process Analysis," Energy Fuels, 2006, 20(5), pp. 1836-1844.
De Diego et al., "Development of Cu-based oxygen carriers for chemical-looping combustion," Fuel, 2004, vol. 83, Issue 13, pp. 1749-1757.
Fan et al., "Chemical looping processes for CO2 capture and carbonaceous fuel conversion prospect and opportunity," Energy Environmental Science, 2012, p. 7254-7280.
Forero et al., "Syngas combustion in a 500 Wth Chemical-Looping Combustion system using an impregnated Cu-based oxygen carrier," Fuel Processing Technology, 2009, vol. 90, Issue 12, pp. 1471-1479.
Garcia-Labiano et al., "Temperature variations in the oxygen carrier particles during their reduction and oxidation in a chemical-looping combustion system," Chemical Engineering Science, 2005, vol. 60, No. 3, pp. 851-862.

(56) References Cited

OTHER PUBLICATIONS

Ghanapragasam et al., "Hydrogen production from coal direct chemical looping and syngas chemical looping combustion systems: Assessment of system operation and resource requirements," International Journal of Hydrogen Energy, 2009, vol. 34, Issue 6, pp. 2606-2615.
Go et al., "Hydrogen production from two-step steam methane reforming in a fluidized bed reactor," International Journal of Hydrogen Energy, 2009, vol. 34, p. 1301-1309.
Gao et al., "Production of syngas via autothermal reforming of methane in a fluidized-bed reactor over the combined $CeO_2$-$ZrO_2$/$SiO_2$ supported Ni catalysts," International Journal of Hydrogen Energy, 2008, vol. 33, p. 5493-5500.
Hossain et al., "Chemical-looping combustion (CLC) for inherent CO2 separations—a review," Chemical Engineering Science, 2008, vol. 63, Issue 18, pp. 4433-4451.
Hua et al., "Three Dimensional Analysis of Electrical Capacitance Tomography Sensing Fields," 1999 IOP Publishing LTD, vol. 10, pp. 717-725.
Johansson et al., "Combustion of Syngas and Natural Gas in a 300 W Chemical-Looping Combustor," Chemical Engineering Research and Design Volume, 2006, vol. 84, Issue 9, pp. 819-827.
Leion et al., "Solid fuels in chemical-looping combustion using oxide scale and unprocessed iron ore as oxygen carriers," Fuel, 2009, vol. 88, Issue 10, pp. 1945-1954.
Leion et al., "Solid fuels in chemical-looping combustion," International Journal of Greenhouse Gas Control, 2008, vol. 2, Issue 2, pp. 180-193.
Leion et al., "The use of petroleum coke as fuel in chemical-looping combustion," Fuel, 2007, vol. 86, Issue 12-13, pp. 1947-1958.
Li et al., "Role of Metal Oxide Support in Redox Reactions of Iron Oxide for Chemical Looping Applications: Experiments and Density Functional Theory Calculations," Energy Environmental Science, 2011, vol. 4, p. 3661-3667.
Li et al., "Syngas chemical looping gasification process: Bench-scale studies and reactor simulations," Aiche Journal, 2010, vol. 56, Issue 8, pp. 2186-2199.
Li et al., "Syngas Chemical Looping Gasification Process: Oxygen Carrier Particle Selection and Performance," Energy Fuels, 2009, 23(8), pp. 4182-4189.
"Chemical-Looping Combustion of Solid Fuels—Status of Development" Lyngfelt, Applied Energy, 2014, vol. 113, p. 1869-1873.
Lyngfelt, "Oxygen Carriers for Chemical Looping Combustion Operational Experience," 1st International Conference on Chemical Looping, Mar. 2010.
Mamman et al., "Simultaneous steam and CO2 reforming of methane to syngas over NiO/MgO/SA-5205 in presence and absence of oxygen," Applied Catalysis A, 1998, vol. 168, p. 33-46.
Marashdeh, Q. et al., "A Multimodal Tomography System Based on ECT Sensors," IEEE Sensors Journal, vol. 7, No. 3, 2007, 426-433.
Marashdeh, Q., Advances in Electrical Capacitance Tomography, Dissertation, The Ohio State University, 2006.
Mattisson et al., "CO 2 capture from coal combustion using chemical-looping combustion—Reactivity investigation of Fe, Ni and Mn based oxygen carriers using syngas," Department of Energy and Environment, Division of Energy Technology and Department of Chemical and Biological Engineering, Division of Environmental Inorganic Chemistry, Chalmers University of Technology, 2007.
Mattisson et al., "Chemical-looping combustion using syngas as fuel," International Journal of Greenhouse Gas control, 2007, vol. 1, Issue 2, pp. 158-169.
Ortiz et al., "Hydrogen Production by Auto-Thermal Chemical-Looping Reforming in a Pressurized Fluidized Bed Reactor Using Ni-based Oxygen Carriers," International Journal of Hydrogen Energy, 2010, vol. 35, p. 151-160.
Denton et al., "Simultaneous Production of High-Purity Hydrogen and Sequestration-Ready CO2 from Syngas," Dec. 2003.

Pröll et al., "Syngas and a separate nitrogen/argon stream via chemical looping reforming—A 140 kW pilot plant study," Fuel, 2010, vol. 89, Issue 6, pp. 1249-1256.
Ruchenstein et al., "Carbon dioxide reforming of methane over nickel/alkaline earth metal oxide catalysts," Applied Catalysis A, 1995, vol. 133, p. 149-161.
Ryden et al., "Synthesis gas generation by chemical-looping reforming in a continuously operating laboratory reactor," Fuel, 2006, vol. 85, p. 1631-1641.
Scott et al., "In situ gasification of a solid fuel and CO2 separation using chemical looping," AICHE Journal, 2006, vol. 52, Issue 9, pp. 3325-3328.
Shen et al., "Experiments on chemical looping combustion of coal with a NiO based oxygen carrier," Combustion and Flame, 2009, vol. 156, Issue 3, pp. 721-728.
Sridhar et al., "Syngas Chemical Looping Process: Design and Construction of a 25 kWth Subpilot Unit," Energy Fuels, 2012, 26(4), pp. 2292-2302.
Tian et al., "Thermodynamic investigation into carbon deposition and sulfur evolution in a Ca-based chemical-looping combustion system," Chemical Engineering Research & Design, 2011, vol. 89, Issue 9, p. 1524.
Usachev et al., "Conversion of Hydrocarbons to Synthesis Gas: Problems and Prospects," Petroleum Chemistry, 2011, vol. 51, p. 96-106.
Warsito, W. et al., Electrical Capacitance Volume Tomography, 2007, pp. 1-9.
Yamazaki et al., "Development of highly stable nickel catalyst for methane-steam reaction under low steam to carbon ratio," Applied Catalyst A, 1996, vol. 136, p. 49-56.
Zafar et al., "Integrated Hydrogen and Power Production with CO2 Capture Using Chemical-Looping ReformingRedox Reactivity of Particles of CuO, Mn2O3, NiO, and Fe2O3 Using SiO2 as a Support," Ind. Eng. Chem. Res., 2005, 44(10), pp. 3485-3496.
International Search Report and Written Opinion for Application No. PCT/US14/14877 dated May 14, 2014 (10 pages).
International Search Report and Written Opinion for Application No. PCT/US14/25520 dated Jul. 11, 2014 (13 pages).
International Search Report and Written Opinion for Application No. PCT/US14/26071 dated Jul. 10, 2014 (9 pages).
International Search Report and Written Opinion for Application No. PCT/US2014/027839 dated Jul. 24, 2014 (9 pages).
International Search Report and Written Opinion for Application No. PCT/US2014/028217 dated Jul. 28, 2014 (8 pages).
International Search Report and Written Opinion for Application No. PCT/US2015/018123 dated May 8, 2015 (10 pages).
Australian Patent Office Examination Report No. 1 for Application No. 2010292313 dated Aug. 15, 2014 (4 pages).
Australian Patent Office Examination Report No. 2 for Application No. 2010292313 dated May 25, 2015 (3 pages).
Chinese Patent Office Action for Application No. 201080048130.2 dated Jul. 24, 2014 (6 pages, English translation only).
Chinese Patent Office Action for Application No. 201080048130.2 dated Mar. 13, 2015 (4 pages, English translation only).
European Patent Office Action for Application No. 10760504.0 dated Dec. 9, 2013 (7 pages).
European Patent Office Action for Application No. 10760504.0 dated Feb. 2, 2015 (5 pages).
United States Patent Office Action for U.S. Appl. No. 13/394,396 dated Dec. 18, 2014 (14 pages).
United States Patent Office Final Rejection for U.S. Appl. No. 13/394,396 dated Jul. 2, 2015 (15 pages).
United States Patent Office Action for U.S. Appl. No. 14/091,654 dated Oct. 30, 2014 (14 pages).
United States Patent Office Action for U.S. Appl. No. 14/091,654 dated Jun. 12, 2015 (16 pages).
United States Patent Office Notice of Allowance for U.S. Appl. No. 14/504,295 dated Sep. 28, 2015 (10 pages).

* cited by examiner

INTEGRATION OF REFORMING/WATER SPLITTING AND ELECTROCHEMICAL SYSTEMS FOR POWER GENERATION WITH INTEGRATED CARBON CAPTURE

The present invention is generally directed to systems and methods of electricity generation with in-situ $CO_2$ capture. In certain embodiments, a reduction-oxidation (redox) system using one or more chemical intermediates is utilized to convert carbonaceous fuel with $CO_2$ capture. This is followed by strategic integration with an electrochemical conversion device to produce electricity. In other embodiments, water splitting systems are integrated with the electrochemical systems. Through the process integrations, the process auxiliary power consumption and/or water utilization and energy used for steam generation are minimized.

Fossil fuels including crude oil, natural gas, and coal represent the majority of today's energy supply worldwide. The use of fossil fuels, however, requires that they be transformed to a carrier such as heat, electricity, liquid fuels, or chemicals through chemical conversion processes. With an increasing energy demand and concomitant concerns over the carbon emissions from fossil fuel usage, extensive efforts have been geared toward developing carbon neutral, efficient and economical energy systems that are sustainable. A transition from the use of fossil fuels to that of nuclear and renewable resources such as solar and biomass, thus, represents the natural progression of such efforts.

Existing electricity generation technologies have one or more of the following limitations/drawbacks: 1) high costs (e.g., photovoltaic, gasification, ultra-supercritical pulverized coal combustion); 2) low efficiency (e.g., sub-critical pulverized coal combustion); 3) environmental concerns (e.g., fossil fuel power plants); and 4) safety concerns (e.g., nuclear power).

One of the common issues with respect to a conventional thermal power plant is the large amount of exergy loss during cooling and reheating of steam. A system and method that minimizes the requirements for steam generation is thus desirable.

Chemical reactions between carbonaceous fuels and air/steam/$CO_2$ through the assistance of a reaction medium may represent an effective way to minimize exergy loss in the fuel conversion process. A number of techniques have been proposed to convert carbonaceous fuels using metal oxide. For example, Watkins, U.S. Pat. No. 3,027,238, describes a method for producing hydrogen gas including reducing a metal oxide in a reducing zone, and oxidizing the reduced metal with steam to produce hydrogen in an oxidizing zone. This technique, however, is limited to gaseous fuel conversion. Moreover, the gaseous fuel is only partially converted by the metal oxide. Thomas, U.S. Pat. No. 7,767,191; Fan, PCT Application No. WO 2007082089; and Fan, PCT Application No. WO 2010037011 describe methods for producing hydrogen gas by reducing a metal oxide in a reduction reaction between a carbon-based fuel and a metal oxide to provide a reduced metal or metal oxide having a lower oxidation state, and oxidizing the reduced metal or metal oxide to produce hydrogen and a metal oxide having a higher oxidation state.

Hydrogen can also be produced from water splitting through photoelectrolysis, thermolysis, and thermochemical routes.

To produce electricity, the aforementioned processes teach the further conversion of the hydrogen product in a gas turbine, gas engine, and/or fuel cell. However, a large amount of steam is used in these processes for hydrogen generation. Simple conversion of hydrogen in conventional hydrogen fueled power generation devices will lead to cooling and reheating of large amounts of steam/water, resulting in a large irreversibility of the power generation system.

With increasing demand for electricity, the need arises for improved processes, systems, and system components therein, which produce electricity with higher efficiency and fewer pollutants.

Embodiments of the present invention are generally directed to high efficiency electricity generation processes and systems with substantially zero $CO_2$ emissions. A closed loop between the unit that generates gaseous fuel ($H_2$, CO, etc.) and the fuel cell anode side is formed. In certain embodiments, the heat and exhaust oxygen containing gas from the fuel cell cathode side are also utilized for the gaseous fuel generation. The power generation efficiencies of the systems disclosed herein are significantly greater than state-of-the-art approaches due to the minimized steam consumption for the gaseous fuel production, in the fuel cell anode loop, as well as the strategic mass and energy integration schemes.

Additional features and advantages provided by embodiments of the present invention will be more fully understood in view of the following drawings and detailed description.

The following detailed description of the illustrative embodiments of the present invention can be best understood when read in conjunction with the following drawings, where like structure is indicated with like reference numerals and in which.

Figure 3:
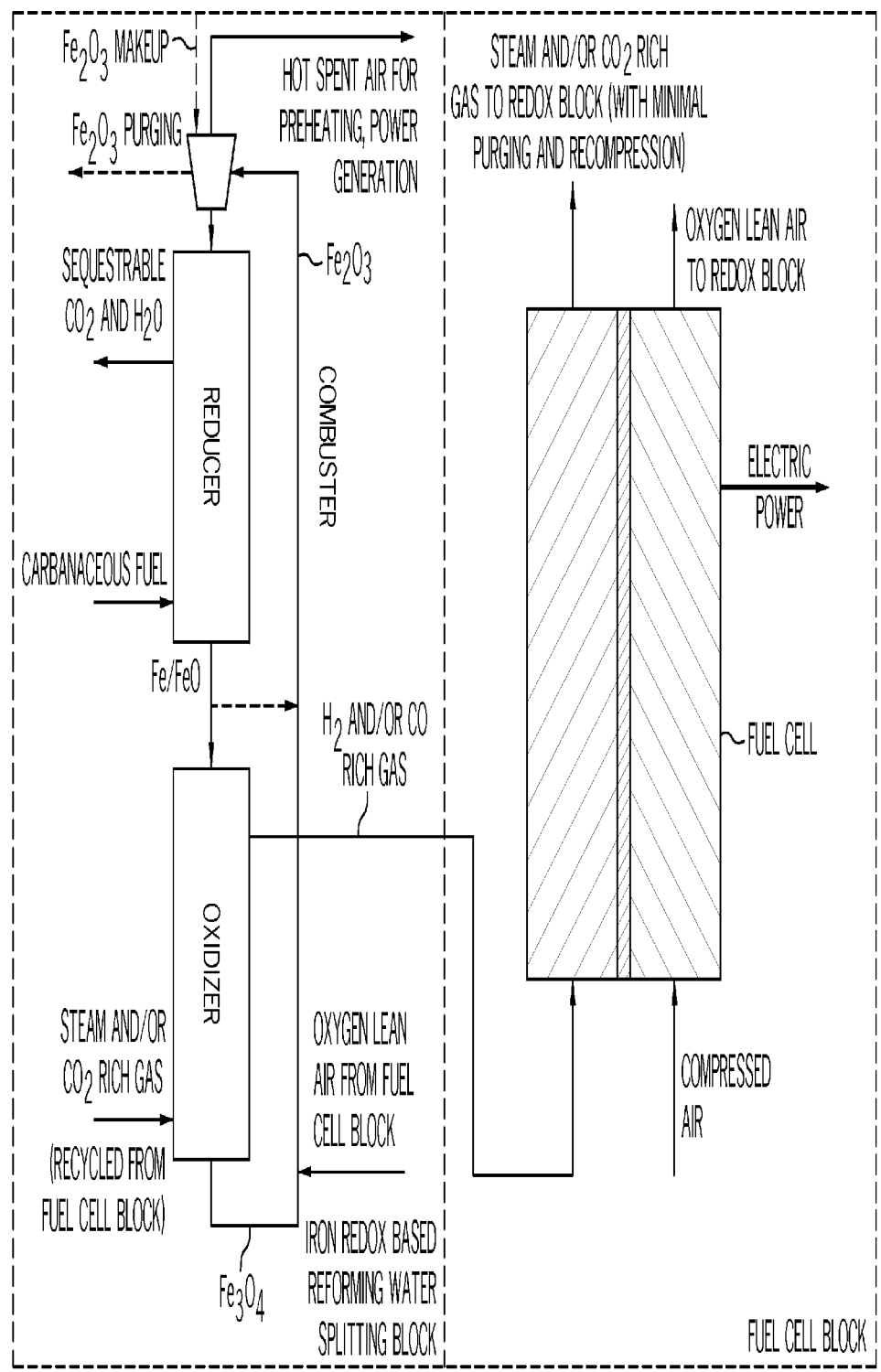

FIG. 3 further illustrates the integration of an embodiment of an iron oxide redox based reforming/water splitting block and a fuel cell system.

Figure 4:
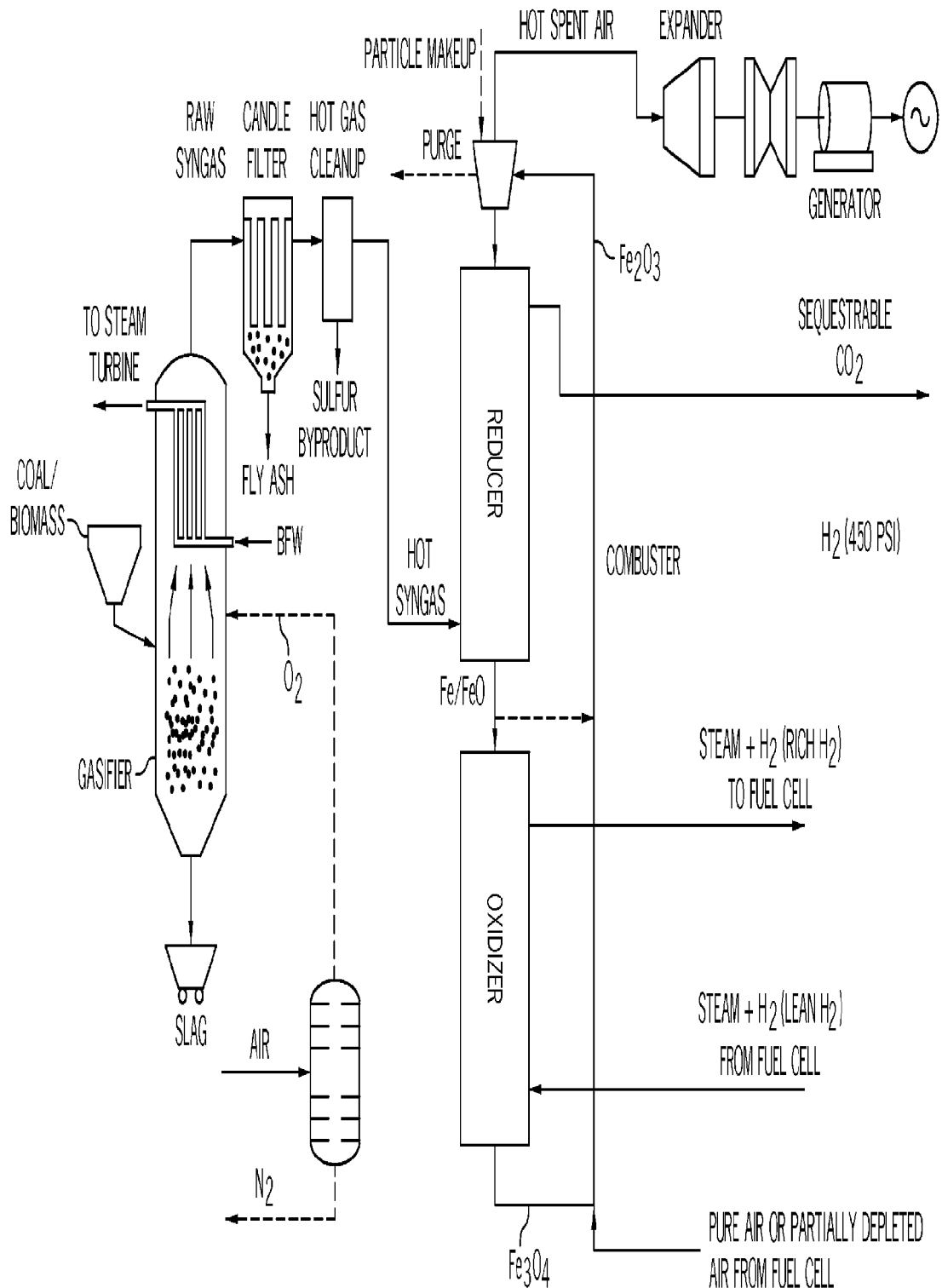

FIG. 4 is a schematic of an embodiment of an iron oxide based redox process using syngas derived from solid fuels such as coal or biomass as feedstock.

Figure 5:
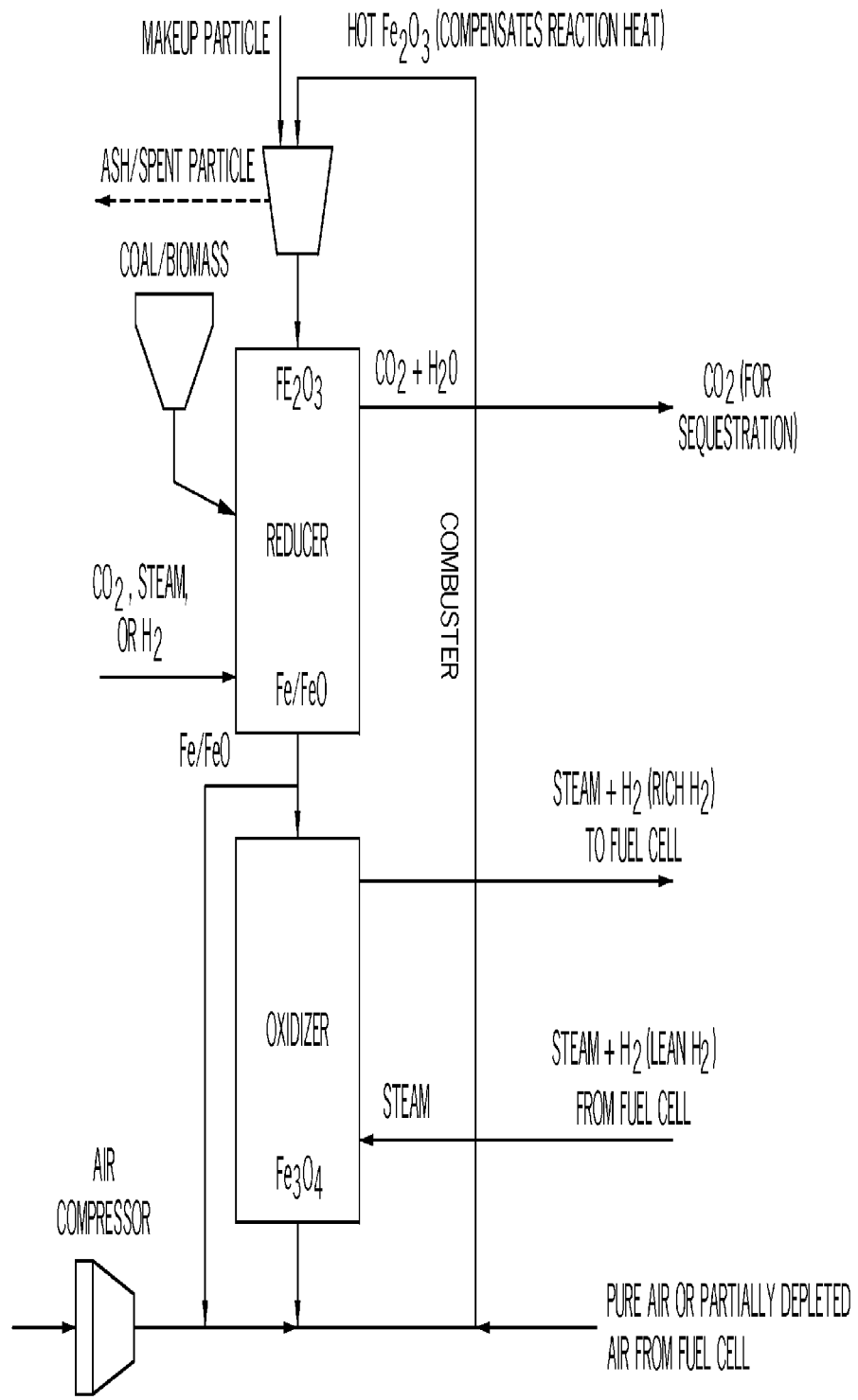

FIG. 5 is a schematic of an embodiment of an iron oxide based redox process using solid fuels such as coal, biomass, and/or solid wastes directly as feedstock and its integration with a fuel cell.

Figure 6:
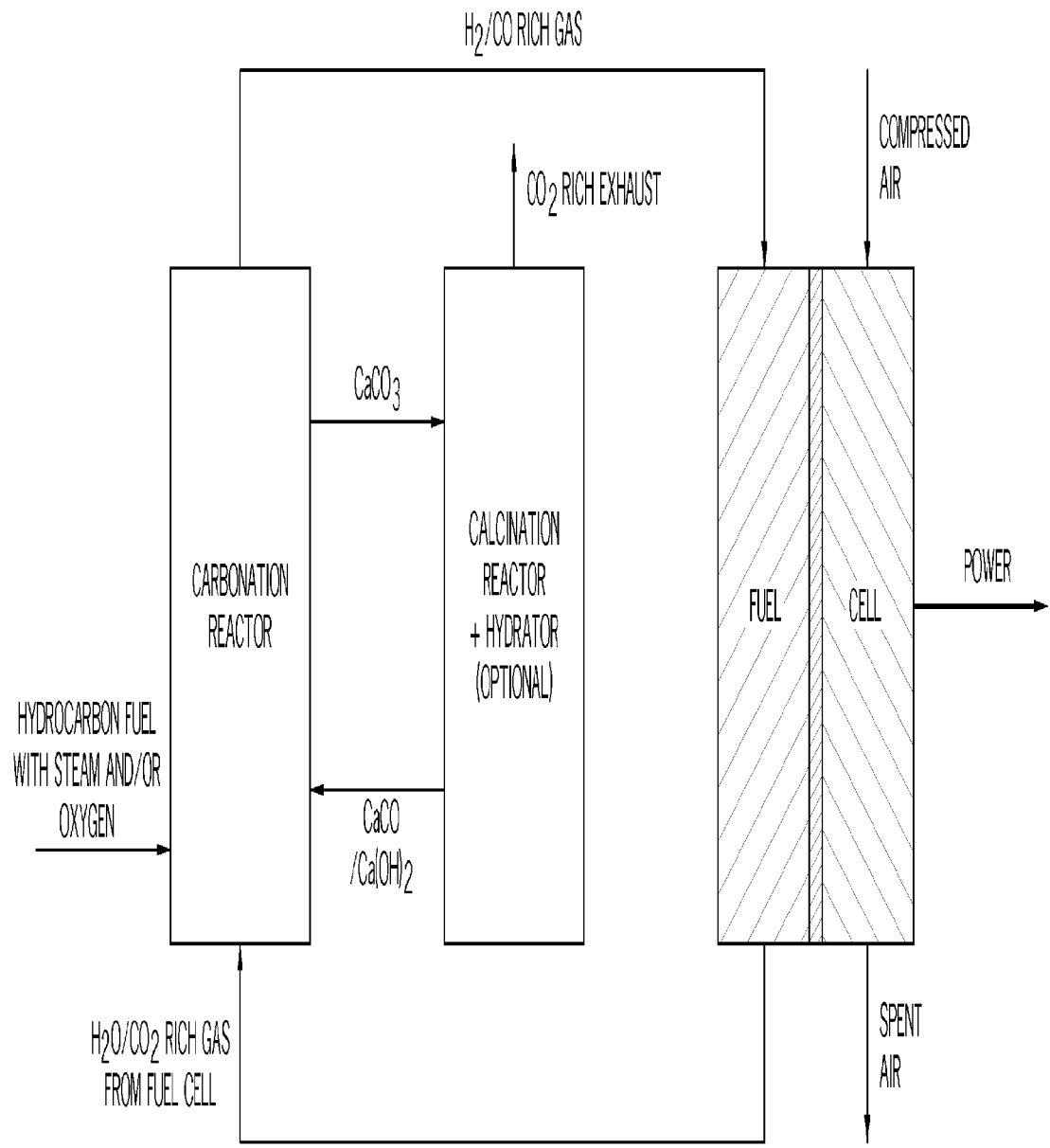

FIG. 6 is a schematic of an embodiment of a calcium based reforming/water splitting block integrated with a fuel cell.

Figure 7:
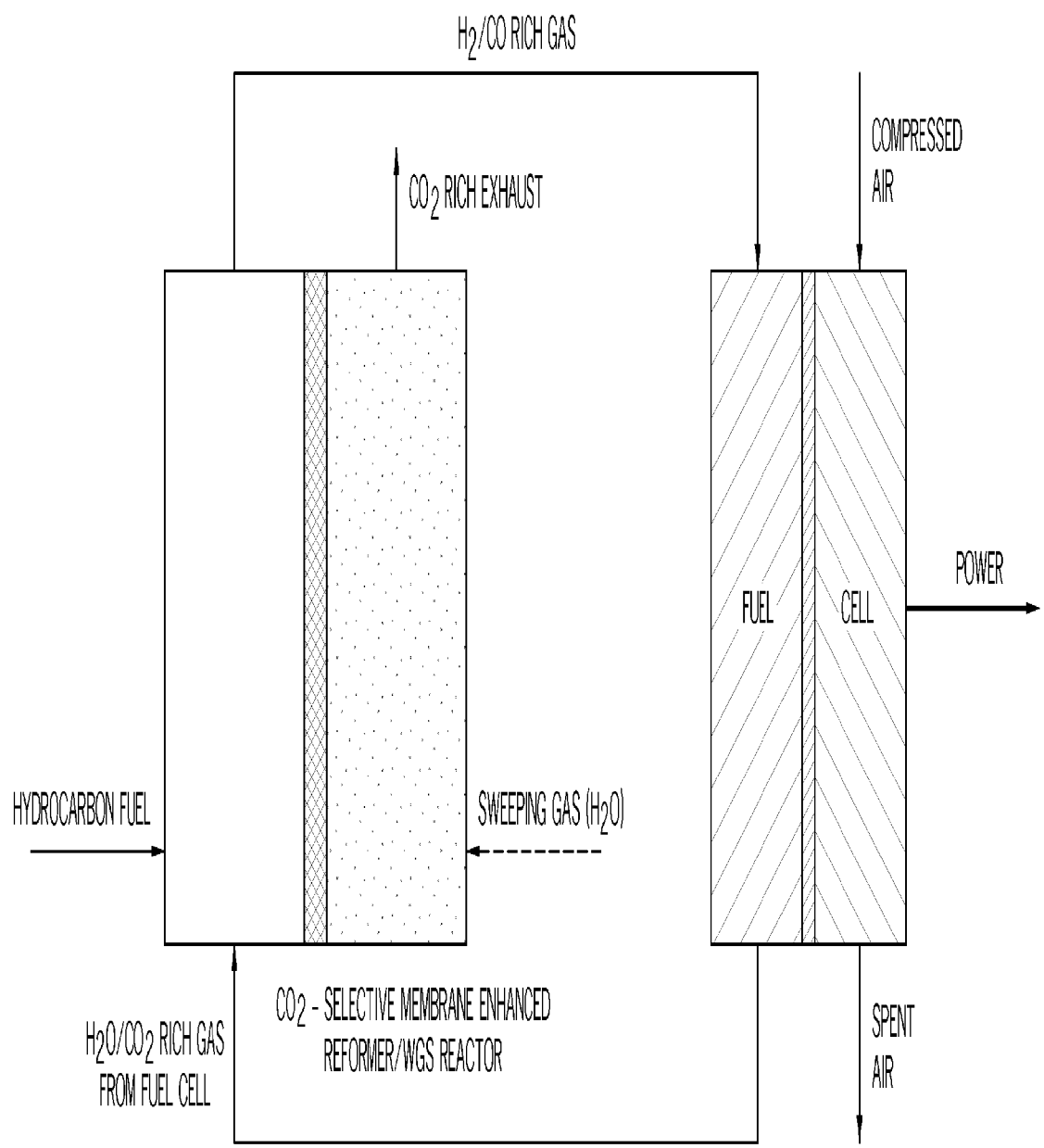

FIG. 7 is a schematic of an embodiment of a membrane enhanced reforming/water splitting block integrated with a fuel cell for power generation.

Figure 8:
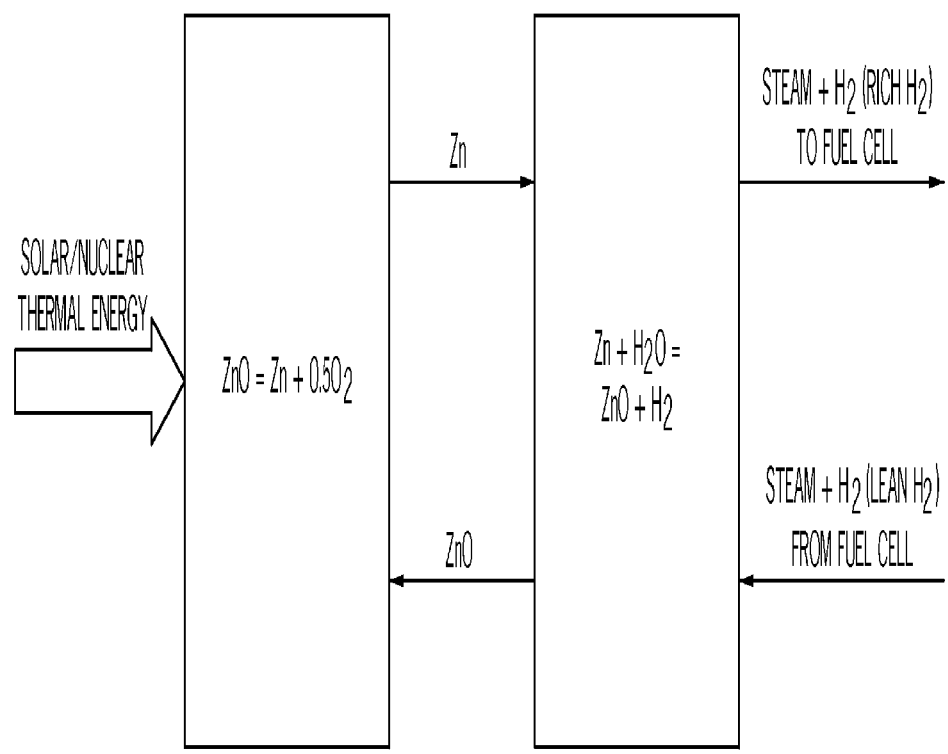

FIG. 8 is a schematic of an embodiment of a zinc based water splitting block using solar or nuclear thermal energy and its integration with a fuel cell using solar or nuclear energy.

Figure 9:
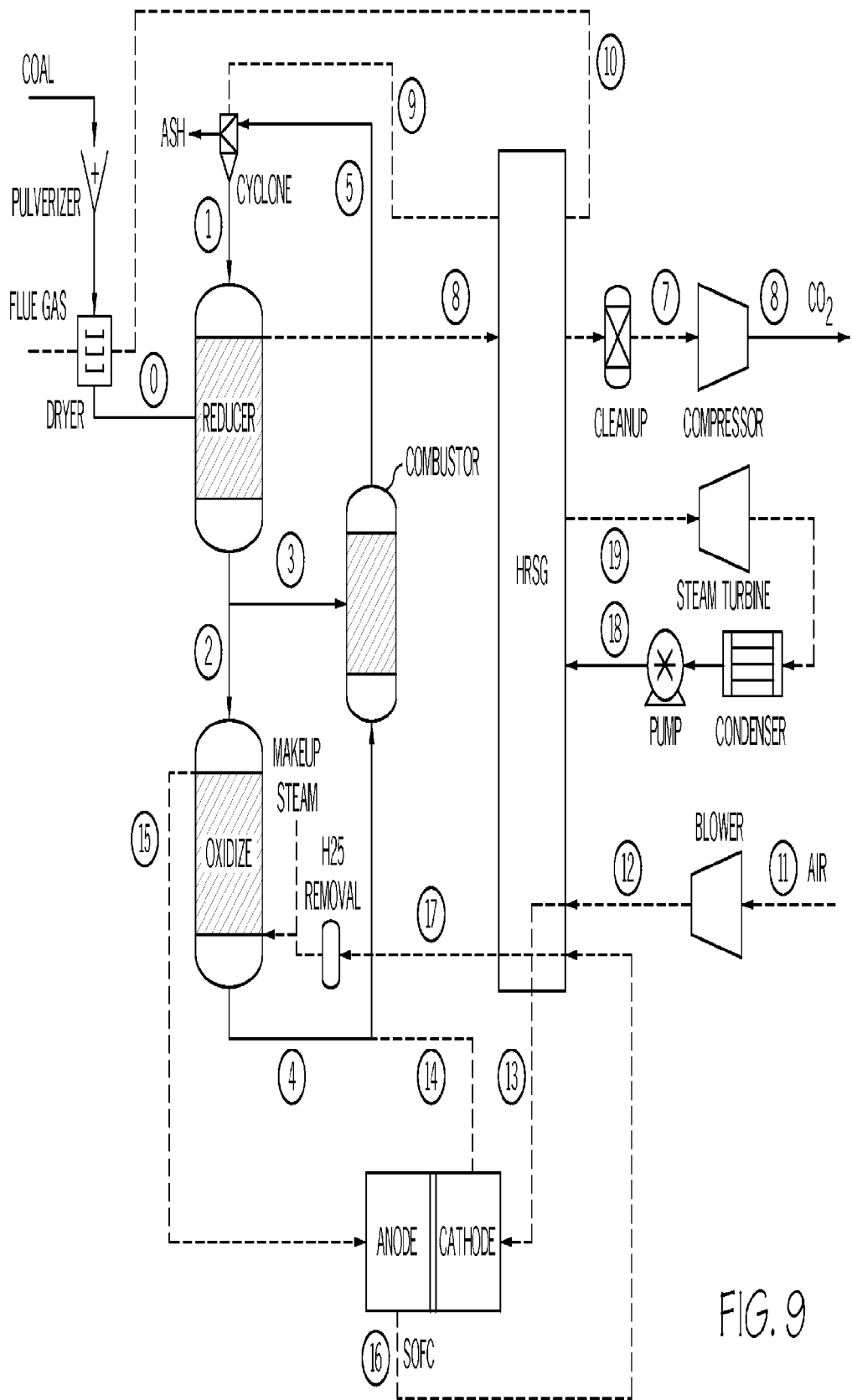

FIG. 9 is a more detailed schematic illustrating an embodiment of an integrated coal to electricity system using redox reactions and a solid oxide fuel cell (SOFC).

Figure 10:
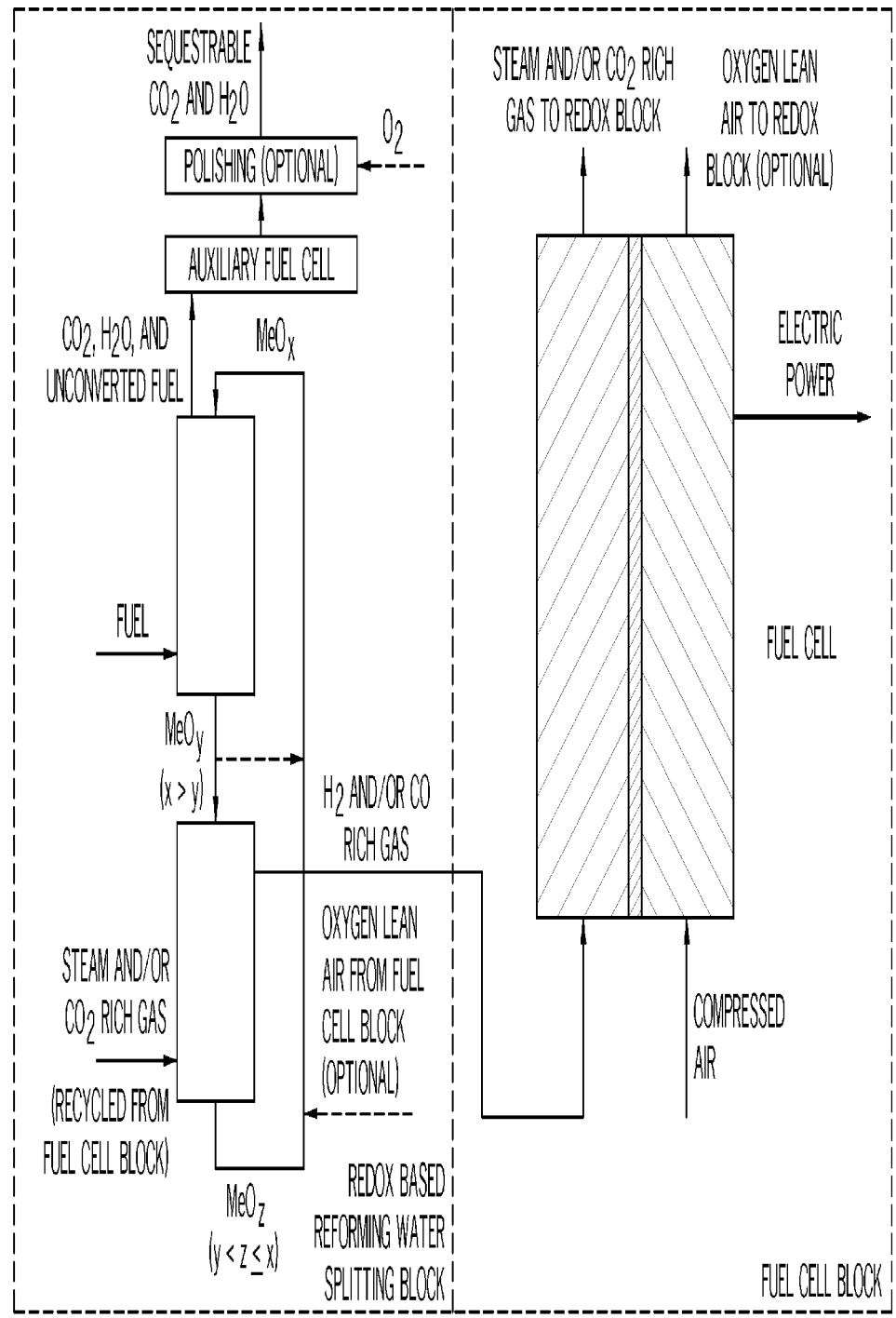

FIG. 10 illustrates an embodiment in which the unconverted fuel from the reducer of a redox based reforming/water splitting block is converted by an auxiliary fuel cell followed by an oxygen polishing step. The working fluid between the oxidizer and the fuel cell block remains a closed loop.

Figure 1:
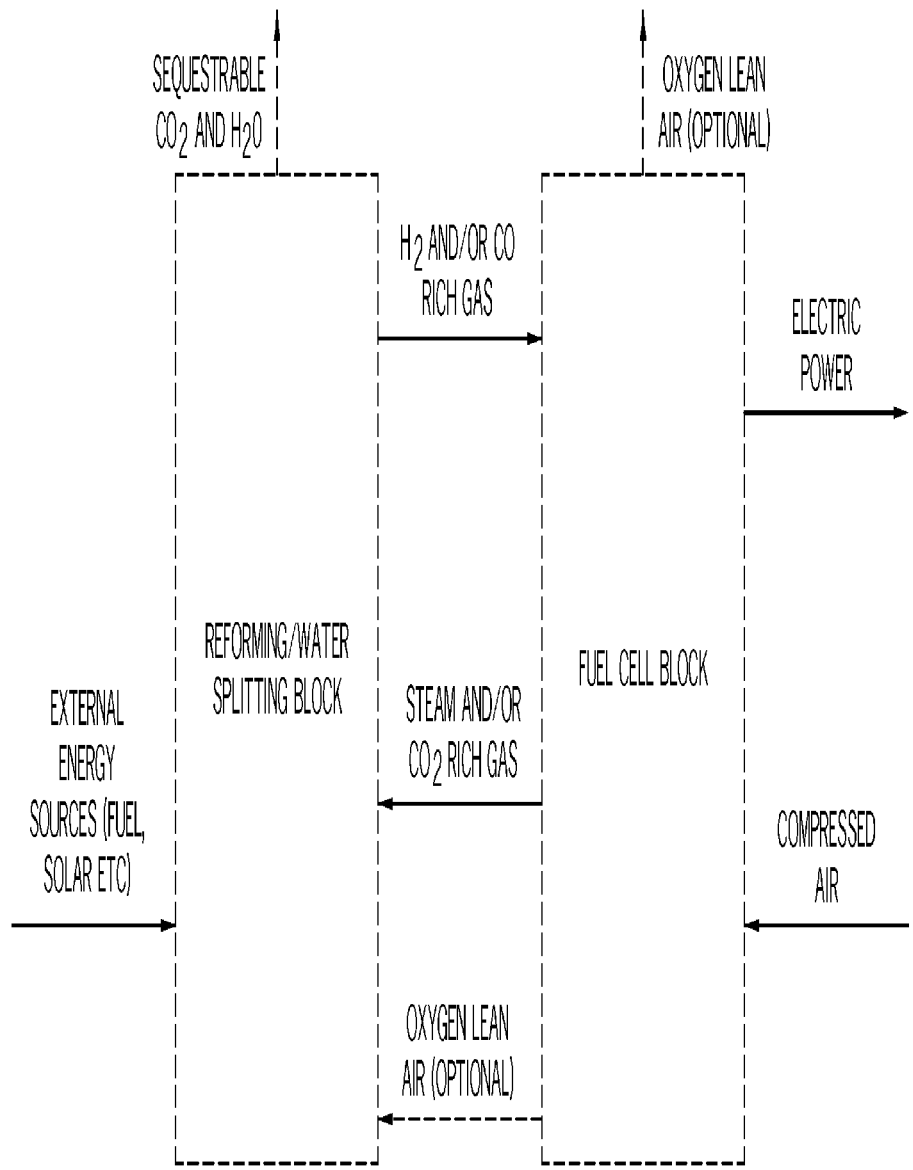
FIG. 1 is a general schematic illustration of a process for producing electricity with minimal steam consumption in accordance with one embodiment in which a fuel cell is integrated with a reforming or water splitting system to minimize steam generation requirements in the process.

Referring generally to FIG. 1, embodiments of the present invention are directed to systems and methods for converting thermal and chemical energy sources into electricity with minimal steam consumption and/or auxiliary power generation and low to zero carbon emissions. All percentages are reported as weight percent unless otherwise noted or the context requires otherwise.

In one embodiment, the system is divided into two blocks or sub-systems, i.e. a reforming/water splitting block and a fuel cell block. The reforming/water splitting block generates gaseous fuels such as hydrogen, syngas, and/or light hydrocarbons from steam/$CO_2$ and an energy source such as solar, nuclear, and carbonaceous fuel. The fuel cell block converts the gaseous fuel from the reforming/water splitting block into electricity while generating an effluent stream which contains unconverted fuel and steam and/or $CO_2$, for the reforming/water splitting block.

The steam/$CO_2$ effluent of the fuel cell block, which may contain unconverted fuel, is recycled to the reforming/water splitting block to generate gaseous fuel. In certain cases, minor reheating and re-pressurization of the effluent is required. Steam condensation and reheating is minimal in all cases.

To maintain the operating pressure of both the reforming/water splitting block and the fuel cell block, a bleed of effluent and/or gaseous fuel is split from the main gaseous stream and re-pressurized. Meanwhile, a re-pressurized makeup stream is merged with the main gaseous stream. Because $CO_2$/steam circulates between the reforming/water splitting block and the fuel cell block along with the CO/$H_2$ fuel, the steam/$CO_2$ acts as a working fluid for electricity generation. The use of turbines, both steam turbines and gas turbines, is minimized in this scheme since the partially converted gaseous fuel from the fuel cell is almost fully recycled to the fuel production stage. A closed loop of working fluid is formed between the reforming/water splitting block and the fuel cell block. By minimizing the steam condensation and reheating and maximizing the fuel conversion in the fuel cell, the irreversibility of the process is minimized.

In the case when a high temperature fuel cell such as a solid oxide fuel cell (SOFC) is used, the sulfur tolerance level is relatively high. Therefore, a simple hot gas clean up unit such as a calcium oxide sorbent bed can be integrated with the working fluid loop.

The operating pressure of the reforming/water splitting block is comparable to the fuel cell block. Both blocks operate at pressures between $1.01 \times 10^5$ Pa and $8.11 \times 10^6$ Pa (1 atm and 80 atm). The temperature of the units ranges between 300° C.–1300° C. The high temperature, high pressure, spent stream from the system can be used to preheat the feed streams, generate power, and re-pressurize the makeup stream.

The energy source for the reforming/water splitting block can either be carbonaceous fuels or thermal energy from other sources such as solar or nuclear. The carbonaceous fuels can include coal, methane, biomass, syngas, pet coke, extra heavy oil, wax and oil shale.

In the case when carbonaceous fuel is used, an oxygen carrier or $CO_2$ sorbent is used to reform/gasify the fuel into hydrogen and/or CO In the case when thermal energy from solar or nuclear is used, a thermo-chemical water splitting scheme is used to convert thermal energy to hydrogen and oxygen.

Figure 2:
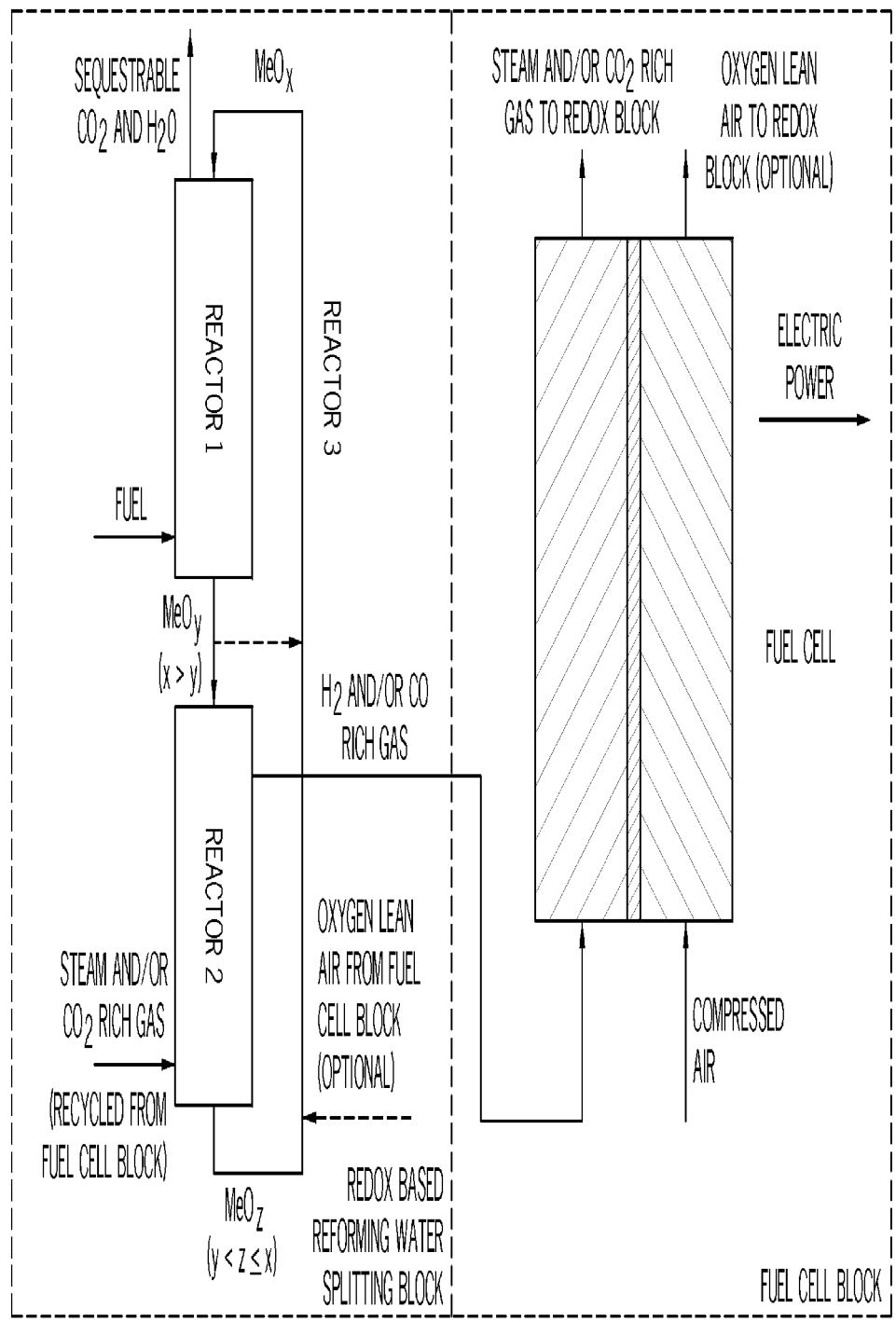
FIG. 2 is a general schematic illustration of an embodiment of the integration of a fuel cell and redox based reforming/water splitting block for electricity generation with minimal steam requirements.

FIG. 2 illustrates a general process configuration in which a carbonaceous fuel is indirectly reformed or gasified with steam/$CO_2$ using a metal oxide based oxygen carrying particle. The reaction in the reduction stage is

In most cases, the metal oxide, the reactor design, and the operating mode are selected such that at least 80% of the fuel is converted into $CO_2$ and steam. In some cases, an oxygen polishing step is used to fully combust the unconverted fuel (<20%) into sequestrable $CO_2$ and $H_2O$. In preferred embodiments, at least 95% of the fuel is converted into $CO_2$ and steam. The exhaust gas stream from the reducing step is thus sequestrable.

The reaction in the oxidation stage of FIG. 2 is

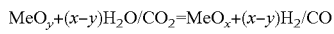

The feed for the oxidation stage, directly withdrawn from the exhaust of the fuel cell anode side (minor recompression is conducted in certain cases), contains fuels such as $H_2$/CO. The fuel concentration in the fuel cell exhaust/oxidation feed typically ranges from 0 to 60%. The $H_2O$/$CO_2$ in the feed stream is at least partially converted to $H_2$/CO, hence the fuel concentration in the gaseous stream is increased. The $H_2$/CO concentration in the product stream of the oxidation stage typically ranges from 30% to 99% and is at least 5% higher than that in the exhaust stream of the fuel cell anode. The fuel enriched stream from the oxidation stage is then directly introduced back to the fuel cell for power generation.

FIG. 3 illustrates a specific process configuration in which a carbonaceous fuel is used as the fuel and iron oxide is used as the oxygen carrier. In this embodiment, a three reactor redox system is used to convert the fuel in a manner similar to that disclosed in Thomas, U.S. Pat. No. 7,767,191; Fan, PCT Application No. WO 2007082089; and Fan, PCT Application No. WO 2010037011. The first reactor, the reducer, is configured to oxidize the carbonaceous fuel into $CO_2$ and steam while reducing a metal oxide based oxygen carrier. In certain embodiments, the carbonaceous fuel is in the form of solid particles which are suspended by the gases in the first reaction zone until they are at least 50% converted before being elutriated towards the top of the first reaction zone. The heat required or generated in the reducer is provided or removed by the oxygen carrier particle. The second reactor, the oxidizer, is configured to (partially) oxidize a portion of the reduced oxygen carrier with either steam or $CO_2$. The third reactor, the combustor, combusts the partially oxidized oxygen carrier in the oxidizer and the remaining portion of the reduced oxygen carrier from the reducer using air.

The feed for the oxidizer is the exhaust from the fuel cell anode side and the product of the oxidizer is directly used as the feed for the fuel cell anode. The oxidizer enriches the fuel content in the working fluid (CO/$H_2$/$CO_2$/$H_2O$) stream. In preferred embodiments, the gaseous stream of the fuel cell anode side and the oxidizer forms a closed loop in which the addition and purging of the gaseous stream is minimal. For example, in certain embodiments less than 10 % of the fuel rich or steam/$CO_2$ rich gas stream is purged. To maintain the pressure of the working fluid, repressurization of the fluid is performed within the main loop or a split loop. In certain embodiments, a high temperature sorbent bed such as that using calcium oxide based sorbent is integrated into the loop to prevent the accumulation of pollutants such as $H_2S$. In other cases, sulfur treatment is carried out only on the bleed stream, the main working fluid stream is not treated.

The oxygen carrier comprises a plurality of ceramic composite particles having at least one metal oxide disposed on a support. Ceramic composite particles are described in Thomas, U.S. Pat. No. 7,767,191; Fan, PCT Application No. WO 2007082089; and Fan, PCT Application No. WO 2010037011.

Referring back to the reduction reaction in the first reactor of FIG. 3, i.e. the reducer, the reducer utilizes various carbonaceous fuels such as syngas, methane and light hydrocarbons, coal, tars, oil shales, oil sands, tar sand, biomass, wax and coke to reduce the iron oxide containing ceramic composite to produce a mixture of reduced metal and/or metal oxide. The possible reduction reactions include:

$$FeO_x + Fuel \rightarrow FeO_y + CO_2 + H_2O$$

$$Fuel + CO_2 \rightarrow CO + H_2$$

$$Fuel + H_2O \rightarrow CO + H_2$$

$$FeO_x + CO/H_2 \rightarrow FeO_y + CO_2/H_2O$$

Specifically, metallic iron (Fe) is formed in the reducer. Simultaneously, an exhaust stream that contains at least 60% $CO_2$ (dry basis) is produced from the reducer. In preferred schemes, the $CO_2$ concentration exceeds 95% and is directly sequestrable.

The preferred designs for the reducer include a moving bed reactor with one or more stages, a multistage fluidized bed reactor, a step reactor, a rotatory kiln or any suitable reactors or vessels known to one of ordinary skill in the art that provide a countercurrent gas-solid contacting pattern. The counter-current flow pattern between solid and gas is adopted to enhance the gas and solid conversion. The counter-current flow pattern minimizes the back-mixing of both solid and gas. Moreover, it maintains the solid outlet of the reactor at a more reductive environment while the gas outlet of the reactor is maintained at a more oxidative environment. As a result, the gas and solid conversions are both enhanced.

Referring back to the oxidation reaction in the second reactor in FIG. 3, i.e. the oxidizer, the oxidizer converts the iron containing oxygen carrier particles from the reducer to a higher oxidation state using the exhaust gas stream of the fuel cell anode, which is rich in $CO_2$ and/or steam. The presence of unconverted fuel in this stream will not participate in the reaction. The possible reactions include:

$$Fe + CO_2/H_2O = FeO + CO/H_2$$

$$3FeO + CO_2/H_2O = Fe_3O_4 + CO/H_2$$

In certain embodiments, only a portion of the reduced oxygen carrier from the reducer is introduced to the oxidizer with the rest bypassing the oxidizer and is directly sent to the combustor. By doing this, more heat is generated from the redox block to compensate for the reaction heat required in the reducer. Alternatively, a sub-stoichiometric amount of fuel cell anode exhaust gas is sent to the oxidizer so that more heat is produced in the combustor that follows.

Although unconverted fuel may be present in the fuel cell anode exhaust stream, the fuel content in this gas stream is significantly enriched resulting from the reaction between iron/iron oxide and $H_2O/CO_2$.

The preferred designs of the oxidizer also include a moving bed reactor and other reactor designs that provide a counter-current gas-solid contacting pattern. A countercurrent flow pattern is preferred so that a high steam to hydrogen and $CO_2$ to CO conversion are achieved.

Referring back to the oxidation reaction in the third reactor in FIG. 3, i.e. the combustor, oxygen containing gas such as air and/or partially converted air from the fuel cell cathode side is used to, at least partially, oxidize the iron in oxygen carrier generated from the oxidizer to $Fe_2O_3$. The reactions in the combustor include:

$$4FeO + O_2 = 2Fe_2O_3$$

$$4Fe_3O_4 + O_2 = 6Fe_2O_3$$

The preferred reactor designs for the combustor include a fast fluidized bed reactor, an entrained bed reactor, a transport bed reactor, or a mechanical conveying system. The functions of the combustor include: oxidation of the oxygen carrier to a higher oxidation state; and re-circulation of the oxygen carrier to the inlet of the reducer for another redox cycle.

FIG. 4 illustrates a schematic flow diagram of one embodiment of the reforming/water splitting block that converts gaseous fuel. In this embodiment, a gasification system is used to convert solid fuel such as coal, biomass, pet coke, and wax into a gaseous fuel. Sulfur in the gaseous fuel is removed using a high temperature sorbent such as those containing calcium oxide, zinc oxide etc. The required sulfur level in the gaseous fuel is <500 ppm. In preferred schemes, the sulfur level in the gaseous fuel is reduced to <20 ppm.

The fuel gas is then introduced to the reducer in FIG. 4 as the fuel for the redox cycles. Alternative to the gaseous fuel from the gasifier, fuels from the reformer or pyrolyzer can also be used in the redox system. Gaseous fuels such as methane and light hydrocarbon can also be directly introduced to the redox system as the fuel.

One difference between the process and system described in Fan, PCT Application No. WO 2010037011 and embodiments of the present invention is that the gaseous feed for the second reactor, the oxidizer, contains fuel gas such as $H_2$ and CO in addition to $H_2O$ and $CO_2$. In certain embodiments, the oxygen containing gas for the combustor comprises at least a portion of the exhaust gas from the cathode.

The combustor is highly exothermic. The heat generated in the combustor can be used to compensate for the heat required in the reducer. This heat can also be used to preheat the feed streams and to generate power for parasitic energy consumptions. The high pressure gaseous stream discharged from the system can be used to drive expanders for gas compression.

Table 1 illustrates the mass flow of the major streams in one embodiment of the process. Table 2 illustrates the energy balance of one embodiment of the system. In this case, methane is used as the fuel. $H_2O/H_2$ is used as the working fluid. The fuel cell block, which utilizes an SOFC system, converts the fuel ($H_2$) rich gas stream into 70% steam balanced with $H_2$. The HHV efficiency of the process, defined as the energy in the electricity product divided by the higher heating value of the methane feed, is greater than 60%. In this case, substantially all of the $CO_2$ produced is compressed to $1.52 \times 10^7$ Pa (2200 psi) and is ready for sequestration.

TABLE 1

Mass Balance of the Integrated Reforming - Fuel Cell for Power Generation using Methane as the Fuel

| Methane (feed, kmol/s) | $CO_2$ from Reducer (kmol/s)* | $H_2$ rich stream from oxidizer (kmol/s)⁺ | $H_2O$ rich stream from fuel cell anode (kmol/s) |
|---|---|---|---|
| 1.12 | 1.12 | 6.99 | 6.99 |

*the $CO_2$ stream contains less than 0.5% impurities such as unconverted fuel
⁺exhaust from the oxidizer contains 70% $H_2$ and 30% steam

TABLE 2

Energy Balance of the Integrated Reforming - Fuel Cell for Power Generation using Methane as the Fuel

| Methane ($MW_{th}$) | Parasitic Power (MWe) | Power Production (MWe) | Net Power (M)We |
|---|---|---|---|
| 1000 | 80 | 700 | 620 |

In the case where coal and a coal gasifier are used, the process efficiency varies between 38 and 60% (HHV, with $CO_2$ capture) depending on the type of coal and coal gasifier. When biomass is gasified and used for the redox system, the efficiency is 1-10% less than its coal counterpart. Because all of the $CO_2$ in the biomass is captured, the net $CO_2$ emission from the system is negative from the life cycle analysis standpoint.

Referring to the embodiment illustrated in FIG. 5, solid fuel such as coal, biomass, wax, heavy residue, pet coke, and tar sands are directly converted in the redox system without the need for a gasifier/pyrolyzer/reformer. This embodiment depicts a direct coal redox system integrated with solid oxide fuel cell (SOFC) as exemplified herein.

Due to the high operating temperatures in a SOFC system, between about 800° C. to 1000° C., a significant amount of heat is released and needs to be recovered to enhance the process efficiency. Current process designs usually combine SOFC and a gas turbine—steam turbine system for full conversion of fuel to electricity. About 60%~90% of the fuel is converted in the SOFC first, and the remainder will be fully converted in a gas turbine system together with a bottoming Rankine cycle. However, the system is costly because all three components, i.e., the hydrogen production system, fuel cell, and turbine system, are capital intensive. Conventional IGCC-SOFC routes for electricity generation can reach an efficiency of at most 55%.

The direct chemical looping (DCL) process, described in Fan, PCT Application No. WO 2010037011, converts solid fuels into hydrogen. Within the DCL system, an iron oxide based oxygen carrier circulates among three reactors which are the reducer, the oxidizer and the combustor. In the reducer, coal and/or biomass is gasified to $CO_2$ and $H_2O$ by $Fe_2O_3$ containing particles which are reduced to Fe and FeO. A portion of the reduced particles react with steam in the oxidizer to produce hydrogen, while the remaining reduced particles together with the partially oxidized particles from the oxidizer, are fed to the combustor. Finally, $Fe_2O_3$ containing particles are regenerated and recycled back by combusting with oxygen containing gases such as pressurized air. The heat, released in the combustor and carried over to the reducer by the iron oxides, can fully compensate for any heat deficit in the system. By the DCL system, hydrogen and carbon dioxide are generated in different reactors, which saves a considerable amount of energy by eliminating the need for product separation. Also, it saves equipment investment costs on $CO_2$ removal and air separation units. The DCL system can produce hydrogen at an efficiency of 70-85% from coal and 60-75% from biomass.

In this embodiment, we integrate the DCL system and SOFC system for high efficiency electricity generation from coal. The DCL-SOFC process and system have a number of configurations, either at high pressure or low pressure. Specifically, we describe the embodiment where the oxidizer and anode are integrated within a closed loop of hydrogen and steam as shown in FIGS. 5 and 9.

1000 MW thermal input is considered, and accordingly 131.8 tonne/hr of bituminous coal is processed in the DCL-SOFC system. Coal is first pulverized into proper size particles and then dried to 5% moisture from 7.23% by the flue gas. In the DCL system, a moving bed design is adopted for both the reducer and the oxidizer. About 3549.5 tonne/hr oxygen carrier, containing 45.6% $Fe_2O_3$ and 54.4% $Al_2O_3$ (as inert) by weight, is fed into the top of the reducer, and the coal is injected from the middle part of the reducer. In the moving bed reducer, solid flows downward while gas ascends upward. The countercurrent design can fully convert coal into $CO_2$ and $H_2O$ at 900° C., $1.01 \times 10^5$ Pa (1 atm). Iron oxide is reduced to the form of Fe, FeO and a trace of FeS. 71.5% of the reduced iron particles are used for hydrogen generation in the oxidizer, and the other 28.5% are combusted in the combustor. The oxidizer operates at 850° C., converting a gaseous mixture of 90.4% $H_2O$ and 9.6% $H_2$ by mole into a mixture of 35.9% $H_2O$ and 64.1% $H_2$ and ppm level of $H_2S$. The gaseous mixture is then fed to the anode of a sulfur tolerant SOFC for electricity generation. At the same time, Fe and FeO will be oxidized to $Fe_3O_4$, which flows to the combustor for $Fe_2O_3$ regeneration.

An air blower drives 1992 tonne/hr of air to feed the DCL-SOFC system. The air is preheated up to 900° C. in the HRSG section, and then goes to the cathode of the SOFC device. 30% of the oxygen and 85% of the hydrogen are consumed in SOFC operating at 900° C. The spent air is used in the combustor to regenerate $Fe_2O_3$ at 1280° C. The spent hydrogen/steam mixture will then be cooled to about 240° C. for subsequent sulfur removal unit. Only a small amount of steam will be made up to the hydrogen/steam mixture before it recycles back to the oxidizer.

During the DCL-SOFC process, >99% pure $CO_2$ is obtained by simple condensation followed by compression to $1.37 \times 10^7$ Pa (>135 atm) for greenhouse gas control. The compression step consumes about 35.8 MW of work. The other pollutants such as Cl, S, and Hg can either be co-sequestered with $CO_2$ or removed by conventional techniques. Ash can be removed from the oxygen carrier by a cyclone positioned before the reducer.

Table 3 summarizes the flow of the main process streams. As a result of the integration of the DCL and SOFC, 535 MW of electricity can be produced by the DCL-SOFC system, and 96 MW of electricity can be generated from the steam turbine system by recovering low grade heat. The overall process can produce electricity of 640 MW with $CO_2$ compression, this is equal to a coal to power efficiency of 64% (HHV). The illustrated example can be further optimized to achieve greater than 70% efficiency.

The DCL-SOFC system can convert a wide range of combinations of coal and biomass to electricity with high efficiency. Possible designs also includes low pressure and temperature operation for the working fluid (the mixture of hydrogen and steam). $H_2S$ in the hydrogen/steam mixture can be also removed before the SOFC with hot gas clean up unit. It is noted that when feeding the system with low sulfur fuel (approximately less than 0.2% by weight) such as biomass, no sulfur removal unit is needed.

TABLE 3

Process Flowsheet for the DCL-SOFC Process

| Stream | 0 | 1 | 2 | 3 | 4 | 5 | 6 | 7 | 8 | 9 | 10 |
|---|---|---|---|---|---|---|---|---|---|---|---|
| Temperature ° C. | 30 | 1280 | 901 | 901 | 850 | 1279.6 | 901 | 30 | 159.9 | 1279.6 | 120 |
| Pressure atm | 30 | 30 | 1 | 1 | 30 | 16 | 1 | 1 | 135 | 16 | 16 |
| Mass Flow tonne/hr | 131.878 | 3549.459 | 2336.231 | 931.225 | 2475.293 | 3549.459 | 402.831 | 348.195 | 348.195 | 1709.881 | 1709.88 |

TABLE 3-continued

Process Flowsheet for the DCL-SOFC Process

| | | | | | | | | | | | |
|---|---|---|---|---|---|---|---|---|---|---|---|
| Volume Flow cum/hr | 92.642 | 871.979 | 855.716 | 341.089 | 667.534 | 871.979 | 1.05E+06 | 195769 | 1754.62 | 481020.7 | 121911 |
| Density lb/cuft | 88.868 | 254.118 | 170.438 | 170.438 | 231.49 | 254.118 | 0.024 | 0.111 | 12.388 | 0.222 | 0.876 |
| Mass Flow tonne/hr | | | | | | | | | | | |
| $H_2O$ | 0 | 0 | 0 | 0 | 0 | 0 | 53.058 | 0 | 0 | 0 | 0 |
| $CO_2$ | 0 | 0 | 0 | 0 | 0 | 0 | 348.195 | 348.195 | 348.195 | 0 | 0 |
| $O_2$ | 0 | 0 | 0 | 0 | 0 | 0 | 0 | 0 | 0 | 180.486 | 180.486 |
| $N_2$ | 0 | 0 | 0 | 0 | 0 | 0 | 1.19 | 0 | 0 | 1526.995 | 1527 |
| $H_2S$ | 0 | 0 | 0 | 0 | 0 | 0 | 0 | 0 | 0 | 0 | 0 |
| $H_2$ | 0 | 0 | 0 | 0 | 0 | 0 | 0 | 0 | 0 | 0 | 0 |
| $SO_2$ | 0 | 0 | 0 | 0 | 0 | 0 | 0.388 | 0 | 0 | 0.141 | 0.141 |
| $SO_3$ | 0 | 0 | 0 | 0 | 0 | 0 | 0 | 0 | 0 | 0.006 | 0.006 |
| NO | 0 | 0 | 0 | 0 | 0 | 0 | 0 | 0 | 0 | 2.212 | 2.212 |
| $NO_2$ | 0 | 0 | 0 | 0 | 0 | 0 | 0 | 0 | 0 | 0.039 | 0.039 |
| Fe | 0 | 0 | 326.047 | 129.963 | 0 | 0 | 0 | 0 | 0 | 0 | |
| $Fe_{0.947}O$ | 0 | 0 | 630.558 | 251.341 | 391.333 | 0 | 0 | 0 | 0 | 0 | |
| $Fe_3O_4$ | 0 | 0 | 0 | 0 | 704.799 | 0 | 0 | 0 | 0 | 0 | |
| $Fe_2O_3$ | 0 | 1620.562 | 0 | 0 | 0 | 1620.562 | 0 | 0 | 0 | 0 | |
| $Fe_{0.877}S$ | 0 | 0 | 0.464 | 0.185 | 0 | 0 | 0 | 0 | 0 | 0 | |
| $Al_2O_3$ | 0 | 1928.897 | 1379.162 | 549.736 | 1379.162 | 1928.897 | 0 | 0 | 0 | 0 | |
| COAL | 131.878 | 0 | 0 | 0 | 0 | 0 | 0 | 0 | 0 | 0 | |

| Stream | 11 | 12 | 13 | 14 | 15 | 16 | 17 | 18 | 19 |
|---|---|---|---|---|---|---|---|---|---|
| Temperature °C. | 25 | 59.1 | 900 | 900 | 850 | 900 | 240 | 30 | 600 |
| Pressure atm | 1 | 2 | 2 | 2 | 30 | 30 | 30 | 124 | 124 |
| Mass Flow tonne/hr | 1992.014 | 1992.014 | 1992.014 | 1852.821 | 123.993 | 263.185 | 263.185 | 360.398 | 360.398 |
| Volume Flow cum/hr | 1.69E+06 | 940966.6 | 3.32E+06 | 3.12E+06 | 49218.57 | 51174.2 | 20307.1 | 425.414 | 10786.28 |
| Density lb/cuft | 0.074 | 0.132 | 0.037 | 0.037 | 0.157 | 0.321 | 0.809 | 52.887 | 2.086 |
| Mass Flow tonne/hr | | | | | | | | | |
| $H_2O$ | 0 | 0 | 0 | 0 | 103.165 | 259.895 | 259.895 | 360.398 | 360.398 |
| $CO_2$ | 0 | 0 | 0 | 0 | 0 | 0 | 0 | 0 | 0 |
| $O_2$ | 463.974 | 463.974 | 463.974 | 324.782 | 0 | 0 | 0 | 0 | 0 |
| $N_2$ | 1528.04 | 1528.04 | 1528.04 | 1528.04 | 0 | 0 | 0 | 0 | 0 |
| $H_2S$ | 0 | 0 | 0 | 0 | 0.195 | 0.195 | 0.195 | 0 | 0 |
| $H_2$ | 0 | 0 | 0 | 0 | 20.633 | 3.095 | 3.095 | 0 | 0 |
| $SO_2$ | 0 | 0 | 0 | 0 | 0 | 0 | 0 | 0 | 0 |
| $SO_3$ | 0 | 0 | 0 | 0 | 0 | 0 | 0 | 0 | 0 |
| NO | 0 | 0 | 0 | 0 | 0 | 0 | 0 | 0 | 0 |
| $NO_2$ | 0 | 0 | 0 | 0 | 0 | 0 | 0 | 0 | 0 |

TABLE 4

Coal to Electricity Process Configurations and Process Efficiencies

| | Process Configuration | | | | |
|---|---|---|---|---|---|
| | Conventional Gasification - WGS-SOFC | DCL-SOFT without integration | DCL-SOFC with combustor-cathode integration | DCL-SOFC with closed oxidizer-anode loop and combustor integration | DCL-SOFC with further heat integration of reducer |
| Efficiency (% HHV with $CO_2$ capture) | 38-48% | 50-55% | 51-57% | 58-64% | 66-71% |

Although the DCL-SOFC system and process exemplified in this embodiment is specific to working fluid compositions, type of reforming/water splitting block, and fuel cell block, the choices of aforementioned parameters have a large degree of freedom. For instance, CO and $CO_2$ can be used instead of $H_2/H_2O$ as the working fluid. The various configurations described in Fan, PCT Application No. WO 2010037011 can be used in the reforming/water splitting block. Other fuel cells such as molten carbonate fuel cell (MCFC) can also be integrated with the DCL system. In this case, a portion of the $CO_2$ generated from the DCL reducer is injected to the cathode side of the MCFC to facilitate the conversion. In addition, the DCL system can be configured so that the gaseous exhaust from the reducer is not fully converted. In this case, the unconverted fuel is sent to another fuel cell and/or oxygen polishing step prior to obtaining a concentrated $CO_2$ stream (see FIG. 10). When all the reduced oxygen carrier particles are used for hydrogen production, i.e. the split ratio for direct combustion is 0, and assuming high grade heat in the fluegas from the combustor can be used to heat up the reducer, the electricity generation efficiency can reach 70% with $CO_2$ compression. Table 4 shows the several configurations and corresponding power generation efficiencies.

FIG. 6 illustrates an embodiment in which a calcium sorbent enhances the reforming process and is used as the reforming/water splitting block. In this case, the fuel is reformed/shifted to $H_2$ with the presence of $CaO/Ca(OH)_2$ sorbent and steam/steam rich exhaust gas from the fuel cell anode:

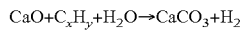

The spent sorbent is then regenerated at high temperatures using the waste heat from the system in the calciner:

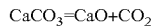

A hydration step is optionally added to reactivate the sorbent. The concentrated $CO_2$ from the calciner is then compressed and sequestered. In this case, a portion of the working fluid can be split to avoid accumulation of the working fluid.

FIG. 7 illustrates the option of using a membrane enhanced reformer/water gas shift reactor as the reforming/water splitting block. In this embodiment, the fuel is reformed/shifted in the reformer, and $CO_2$ is simultaneously removed from the membrane. The retentate side of reformer enriches the working fluid with reformed fuel, while the permeate side produces concentrated $CO_2$.

FIG. 8 illustrates an embodiment showing the integration of a zinc oxide water splitting cycle and the fuel cell. In this embodiment, thermal energy from a solar or nuclear source is used to facilitate the zinc oxide based water splitting cycle. The hydrogen obtained from the splitting of water is used to enrich the working fluid comprising $H_2O$ and $H_2$.

It will be apparent to those skilled in the art that various changes may be made without departing from the scope of the invention which is not considered limited to the specific embodiments described in the specification and drawings, but is only limited by the scope of the appended claims.

The invention claimed is:

1. A method for producing electricity and a separate $CO_2$ rich stream from a carbonaceous fuel and steam comprising:
reducing $Fe_2O_3$ containing particles to lower oxidation state metallic iron containing particles by reacting the $Fe_2O_3$ containing particles with a carbonaceous fuel in a first reaction zone, the first reaction zone having a top and a bottom;
oxidizing a first portion of the metallic iron containing particles with a steam or $CO_2$ rich gas from a fuel cell anode in a second reaction zone to provide iron oxide containing particles while generating a fuel rich gas stream comprising $H_2$ or CO;
returning the fuel rich gas stream from the second reaction zone to the anode of the fuel cell via a closed loop between the second reactor zone and the fuel cell, wherein the closed loop comprises a working fluid stream of (1) fuel and (2) steam or $CO_2$;
directly sending a second portion of the metallic iron containing particles from the first reaction zone to a third reaction zone, and oxidizing the second portion of the metallic iron containing particles and iron oxide containing particles obtained from the oxidation reaction in the second reaction zone with an oxygen containing gas to produce $Fe_2O_3$ containing particles in a third reaction zone; and
returning the $Fe_2O_3$ containing particles to the first reaction zone;
wherein at least a portion of the oxygen containing gas used in the third reaction zone is the oxygen containing gas produced from the outlet of a fuel cell cathode.

2. A method as claimed in claim 1 in which the fuel cell comprises a stack of solid oxide fuel cells.

3. A method as claimed in claim 1 in which the carbonaceous fuel comprises syngas, carbon monoxide, methane rich gas, light hydrocarbons, liquid carbonaceous fuels, coal, biomass, tar sand, oil shale, petroleum coke, heavy liquid hydrocarbons, wax, or mixtures thereof.

4. A method as claimed in claim 1 in which $CO_2$ remaining is sequestered after condensing out moisture.

5. A method as claimed in claim 1 in which at least a portion of the oxygen containing gas exits the third reaction zone and is introduced to an inlet of the fuel cell cathode.

6. A method as claimed in claim 1 in which less than 10% of the fuel rich gas stream or the steam or $CO_2$ rich gas is purged.

7. A method as claimed in claim 1 in which the $Fe_2O_3$ containing particles contain supporting material comprising a ceramic material selected from at least one of the group consisting of oxides of Al, Ti, Zr, Y, Si, La, Cr, Mg, Mn, Cu, Ca, carbides of Si and Ti, sepiolite, bentonite, and kaolin.

8. A method as claimed in claim 1 in which the steam or $CO_2$ rich gas or a portion of the fuel rich gas stream is introduced to the bottom of the first reaction zone to enhance the conversions of both $Fe_2O_3$ containing particles and the carbonaceous fuel.

9. A method as claimed in claim 1 in which the carbonaceous fuel is in the form of solid particles which are suspended by gases in the first reaction zone until they are at least 50% converted before being elutriated towards the top of the first reaction zone.

10. A method as claimed in claim 1 in which a portion of the fuel rich gas stream is purged from the closed loop and is repressurized and introduced back to the closed loop.

11. A method as claimed in claim 1 in which heat released from the third reaction zone is used to preheat feed gas streams to the fuel cell cathode or the third reaction zone.

12. A method as claimed in claim 1 in which the fuel cell comprises a molten carbonate fuel cell and at least a portion of $CO_2$ required by the fuel cell cathode is provided by a $CO_2$ rich gas stream produced by the first reaction zone.

13. A method as claimed in claim 1, wherein the fuel of the working fuel stream comprises $H_2$ and CO.

14. A method as claimed in claim 1, wherein the working fluid stream comprises $H_2$, CO, steam, and $CO_2$.

15. A method as claimed in claim 1, in which a portion of the steam or $CO_2$ rich gas is purged from the closed loop and is repressurized and introduced back to the closed loop.

16. A method for producing electricity and a separate $CO_2$ rich stream from a carbonaceous fuel and steam comprising:
reducing $Fe_2O_3$ containing particles to oxidation state metallic iron containing particles by reacting the $Fe_2O_3$ containing particles with a carbonaceous fuel in a first reaction zone, the first reaction zone having a top and a bottom;
oxidizing a first portion of the metallic iron containing particles with a steam or $CO_2$ rich gas from a fuel cell anode in a second reaction zone to provide iron oxide containing particles while generating a fuel rich gas stream comprising $H_2$ or CO;

returning the fuel rich gas stream from the second reaction zone to the anode of the fuel cell via a closed loop between the second reactor zone and the fuel cell, the closed loop comprising a working fluid stream comprising (1) fuel and (2) steam or $CO_2$;

directly sending a second portion of the metallic iron containing particles from the first reaction zone to the third reaction zone, and oxidizing the second portion of the metallic iron containing particles and iron oxide containing particles obtained from the oxidation reaction in the second reaction zone with an oxygen containing gas to produce $Fe_2O_3$ containing particles in a third reaction zone; and returning the $Fe_2O_3$ containing particles to the first reaction zone.

17. The method of claim 16, wherein the fuel of the working fluid stream comprises $H_2$ and CO.

18. The method of claim 16, wherein the working fluid stream comprises $H_2$, CO, steam, and $CO_2$.

* * * * *